United States Patent
Kim

(10) Patent No.: US 11,073,929 B2
(45) Date of Patent: Jul. 27, 2021

(54) LIGHT EMITTING DISPLAY DEVICE, LIGHT EMITTING DISPLAY PANEL, DRIVING CIRCUIT, AND DRIVING METHOD

(71) Applicant: LG Display Co., Ltd., Seoul (KR)

(72) Inventor: SeYoung Kim, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/721,669

(22) Filed: Dec. 19, 2019

(65) Prior Publication Data
US 2020/0210010 A1 Jul. 2, 2020

(30) Foreign Application Priority Data
Dec. 28, 2018 (KR) .......................... 10-2018-0171863

(51) Int. Cl.
*G06F 3/041* (2006.01)
*G06F 3/042* (2006.01)
*G09G 3/3291* (2016.01)

(52) U.S. Cl.
CPC ............ *G06F 3/0412* (2013.01); *G06F 3/042* (2013.01); *G09G 3/3291* (2013.01); *G09G 2310/06* (2013.01)

(58) Field of Classification Search
CPC .... G06F 3/042; G06F 3/04166; G06F 3/0412; G06F 3/0443; G09G 3/3233; G09G 2354/00; G09G 2320/0295; G09G 2320/043; G09G 2310/06; G09G 2310/08; G09G 2300/0426; G09G 2300/0842

See application file for complete search history.

(56) References Cited

U.S. PATENT DOCUMENTS

| | | | |
|---|---|---|---|
| 2012/0218199 A1* | 8/2012 | Kim .................... | G09G 3/3648 345/173 |
| 2016/0216800 A1* | 7/2016 | Cho .................... | G09G 3/3291 |
| 2017/0108993 A1* | 4/2017 | Lee .................... | G06F 3/04166 |
| 2018/0107309 A1* | 4/2018 | Endo .................. | G09G 3/3655 |
| 2018/0120995 A1* | 5/2018 | Lee .................... | H01L 27/323 |
| 2020/0103992 A1* | 4/2020 | Sauer .................. | G06F 3/0416 |
| 2020/0278782 A1* | 9/2020 | Chan ................... | G06F 3/0412 |

* cited by examiner

Primary Examiner — Christopher E Leiby
(74) *Attorney, Agent, or Firm* — Seed IP Law Group LLP

(57) ABSTRACT

Disclosed are a light emitting display device, a light emitting display panel, a driving circuit, and a driving method. A light emitting display device, a light emitting display panel, a driving circuit, and a driving method with an embedded touch sensor are provided in which a data voltage and a first reference voltage are supplied to a plurality of data lines and a plurality of reference electrodes which are arranged in the light emitting display panel in a first driving period, and a second reference voltage different from the first reference voltage is supplied to one or more of the plurality of reference electrodes in a second driving period different from the first driving period.

15 Claims, 27 Drawing Sheets

FIG.24
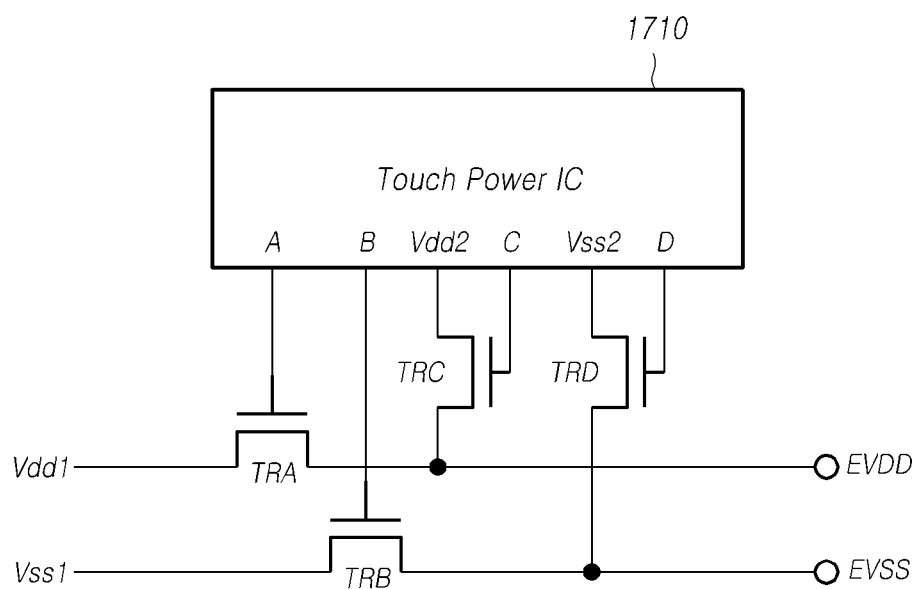
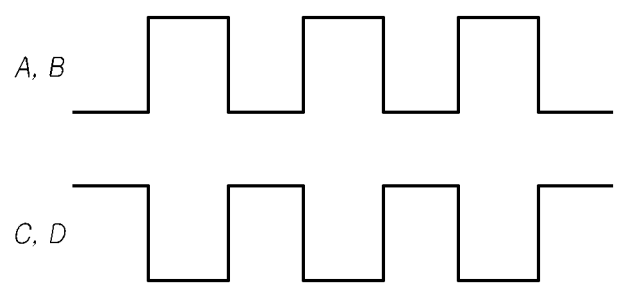

LIGHT EMITTING DISPLAY DEVICE, LIGHT EMITTING DISPLAY PANEL, DRIVING CIRCUIT, AND DRIVING METHOD

CROSS REFERENCE TO RELATED APPLICATION

This application claims priority from Korean Patent Application No. 10-2018-0171863, filed on Dec. 28, 2018, which is hereby incorporated by reference for all purposes as if fully set forth herein.

BACKGROUND

Technical Field

Embodiments of the present disclosure relate to a light emitting display device, a light emitting display panel, a driving circuit, and a driving method.

Description of the Related Art

Recently, various light emitting display devices in which display is embodied by embedding spontaneous light emitting elements such as organic light emitting diodes in a display panel instead of using a backlight unit have been developed.

In order to mount a touch sensing function in such a light emitting display device, a touch panel including a touch sensor is separately manufactured and the touch panel is bonded to a light emitting display panel. In this case, there are problems in that the thickness of the light emitting display device increases and device manufacturing processes become complicated.

BRIEF SUMMARY

One or more of the embodiments of the present disclosure provides a light emitting display device, a light emitting display panel, a driving circuit, and a driving method in which a touch sensor is embedded.

Another embodiment of the present disclosure provides a light emitting display device, a light emitting display panel, a driving circuit, and a driving method in which a touch sensor is embedded in conjunction with a subpixel structure.

Still another embodiment of the present disclosure provides a light emitting display device, a light emitting display panel, a driving circuit, and a driving method that can provide an improved touch sensitivity.

According to an aspect of the present disclosure, there is provided a light emitting display device including: a light emitting display panel in which a plurality of data lines and a plurality of reference voltage lines are arranged in a first direction, a plurality of gate lines are arranged in a second direction, a plurality of subpixels which are formed adjacent to the plurality of data lines and the plurality of gate lines that are arranged in a matrix type, and a plurality of reference electrodes which are electrically connected to the plurality of reference voltage lines are arranged; a data driving circuit that drives the plurality of data lines; and a reference electrode driving circuit that drives the plurality of reference electrodes via the plurality of reference voltage lines.

Each subpixel includes a light emitting element, a driving transistor that drives the light emitting element, and a first transistor that is controlled between ON and OFF in accordance with a sensing signal and is electrically connected between a source node or a drain node of the driving transistor and the corresponding data line.

In a first driving period, the data driving circuit supplies a data voltage to the plurality of data lines and the reference electrode driving circuit supplies a first reference voltage to the plurality of reference electrodes via the plurality of reference voltage lines.

In a second driving period different from the first driving period, the reference electrode driving circuit supplies a second reference voltage different from the first reference voltage to one or more of the plurality of reference electrodes via one or more of the plurality of reference voltage lines.

Each of the plurality of reference electrodes may overlap two or more subpixels.

The plurality of reference electrodes may include a first reference electrode and a second reference electrode. The first reference electrode may be electrically connected to a first reference voltage line and the second reference electrode may be electrically connected to a second reference voltage line. The second reference voltage line may overlap the first reference electrode and be insulated from the first reference electrode in the light emitting display panel.

In the first driving period, the first reference voltage which is supplied to the reference electrode via the reference voltage line may be divided and supplied to gate nodes of the driving transistors in two or more subpixels overlapping the reference electrode.

In the second driving period, the second reference voltage which is supplied to the reference electrode via the reference voltage line may not be supplied to the gate nodes of the driving transistors in two or more subpixels overlapping the reference electrode.

The first transistor may be turned on at a selected timing in the first driving period and supply the data voltage supplied via the data line to a source node or a drain node of the driving transistor. The first transistor may be turned off in the second driving period.

The sensing signal which is supplied to the gate node of the first transistor may have a turn-on level voltage at a turn-on timing of the first transistor and have a turn-off level voltage at other timings in the first driving period.

A voltage level of the sensing signal which is supplied to the gate node of the first transistor may swing within a turn-off level voltage range and one or more of a frequency, a phase, and an amplitude of the sensing signal may correspond to the second reference voltage in the second driving period.

A second transistor that is controlled between ON and OFF in accordance with a scan signal and is electrically connected between the reference electrode and a gate node of the driving transistor may be disposed in the light emitting display panel.

The second transistor may be turned on at a selected timing in the first driving period and supply the first reference voltage supplied to the reference electrode via the reference voltage line to the gate node of the driving transistor. The second transistor may be turned off in the second driving period.

The scan signal of the second transistor may have a turn-on level voltage at a turn-on timing of the second transistor and have a turn-off level voltage at other timings in the first driving period.

A voltage level of the scan signal of the second transistor may swing within a turn-off level voltage range and one or more of a frequency, a phase, and an amplitude of the scan signal may correspond to the second reference voltage in the second driving period.

The second transistor may be disposed for each subpixel.

Alternatively, the second transistor may be disposed for every two or more subpixels.

When the plurality of reference electrodes overlap the subpixels of X rows and Y columns (where X and Y are natural numbers equal to or greater than 2), the second transistors of equal to or greater than one and less than Y may be arranged every X rows in areas of the plurality of reference electrodes.

A drain node or a source node of the second transistor may be connected to the corresponding reference electrode, and the source node or the drain node of the second transistor may be connected to the gate nodes of two or more driving transistors.

The first driving period may be an image driving period for displaying an image or a display sensing period for sensing a threshold voltage or a mobility.

The second driving period may be a touch driving period.

The first reference voltage may have a constant voltage level, and the second reference voltage may swing with a selected amplitude.

A data load-free signal of which one or more of a frequency, a phase, and an amplitude corresponds to the second reference voltage may be supplied to all or some of the plurality of data lines in the second driving period.

A gate load-free signal of which one or more of a frequency, a phase, and an amplitude corresponds to the second reference voltage may be supplied to all or some of the plurality of gate lines in the second driving period.

The light emitting display device may further include an analog-to-digital converter that is electrically connected to the data line, senses a voltage of the data line, and converts the sensed voltage into a digital value.

The light emitting display device may further include a sampling switch that is electrically connected between the data line and the analog-to-digital converter, an initialization switch that is electrically connected between the data line and an initialization voltage supply node, a data switch that is electrically connected between the data line and a data voltage supply node, and a reference switch that is electrically connected to the reference voltage line and a reference voltage supply node.

According to another aspect of the present disclosure, there is provided a method of driving a light emitting display device in which a plurality of data lines and a plurality of reference voltage lines are arranged in a first direction, a plurality of gate lines are arranged in a second direction, a plurality of subpixels which are formed adjacent to the plurality of data lines and the plurality of gate lines which are arranged in a matrix type.

The method of driving the light emitting display device includes: supplying a data voltage to the plurality of data lines and supplying a first reference voltage to a plurality of reference electrodes which are electrically connected to the plurality of reference voltage lines in a first driving period; and supplying a second reference voltage different from the first reference voltage to one or more of the plurality of reference electrodes via one or more of the plurality of reference voltage lines in a second driving period different from the first driving period.

The first driving period may be an image driving period for displaying an image or a display sensing period for sensing a threshold voltage or a mobility.

The second driving period may be a touch driving period.

The first reference voltage may have a constant voltage level, and the second reference voltage may swing with a selected amplitude.

According to still another aspect of the present disclosure, there is provided a light emitting display panel including: a plurality of data lines that are arranged in a first direction; a plurality of reference voltage lines that are arranged in the first direction; a plurality of gate lines that are arranged in a second direction; a plurality of subpixels that are formed adjacent to the plurality of data lines and the plurality of gate lines and are arranged in a matrix type; and a plurality of reference electrodes that are electrically connected to the plurality of reference voltage lines.

Each subpixel may include a light emitting element, a driving transistor that drives the light emitting element, and a first transistor that is controlled between ON and OFF in accordance with a sensing signal and is electrically connected between a source node or a drain node of the driving transistor and the corresponding data line.

The plurality of reference electrodes may be supplied with a first reference voltage via the plurality of reference voltage lines in a first driving period.

One or more of the plurality of reference electrodes may be supplied with a second reference voltage different from the first reference voltage via one or more of the plurality of reference voltage lines in a second driving period different from the first driving period.

Each of the plurality of reference electrodes may be disposed under an active layer in a transistor area.

According to still another aspect of the present disclosure, there is provided a driving circuit that drives a light emitting display panel including a light emitting element, a driving transistor that drives the light emitting element, and a first transistor that is controlled between ON and OFF in accordance with a sensing signal and is electrically connected between a source node or a drain node of the driving transistor and a corresponding data line.

The driving circuit includes: a data driving circuit that supplies a data voltage to a plurality of data lines which are arranged in the light emitting display panel in a first driving period; and a reference electrode driving circuit that supplies a first reference voltage to a plurality of reference electrodes which are arranged in the light emitting display panel in the first driving period and supplies a second reference voltage different from the first reference voltage to one or more of the plurality of reference electrodes in a second driving period different from the first driving period.

According to still another aspect of the present disclosure, there is provided a light emitting display device including: a plurality of subpixels of which each includes a light emitting element and a driving transistor that drives the light emitting element; a plurality of data lines that transmit a data voltage which is supplied to source nodes or drain nodes of the driving transistors in the plurality of subpixels; a plurality of reference voltage lines that transmit a reference voltage which is supplied to gate nodes of the driving transistors in the plurality of subpixels; and a plurality of reference electrodes that are electrically connected to the plurality of reference voltage lines.

In the light emitting display device, each of the plurality of reference electrodes lines may overlap areas of two or more subpixels.

The reference voltage which is supplied via an arbitrary first reference voltage line out of the plurality of reference voltage lines may be supplied to the gate nodes of the driving transistors in two or more subpixels overlapping the first reference electrode via a first reference electrode which is electrically connected to the first reference voltage line.

According to the embodiments of the present disclosure, it is possible to provide a light emitting display device, a light emitting display panel, a driving circuit, and a driving method in which a touch sensor is embedded.

According to the embodiments of the present disclosure, it is possible to provide a light emitting display device, a light emitting display panel, a driving circuit, and a driving method in which a touch sensor is embedded in conjunction with a subpixel structure.

According to the embodiments of the present disclosure, it is possible to provide a light emitting display device, a light emitting display panel, a driving circuit, and a driving method that can provide an improved touch sensitivity.

BRIEF DESCRIPTION OF THE SEVERAL VIEWS OF THE DRAWINGS

FIG. 24 is a timing diagram illustrating a swing circuit of a drive voltage and a base voltage when the light emitting display device according to the embodiments of the present disclosure performs load-free driving in a touch driving period;

DETAILED DESCRIPTION

Figure 1:
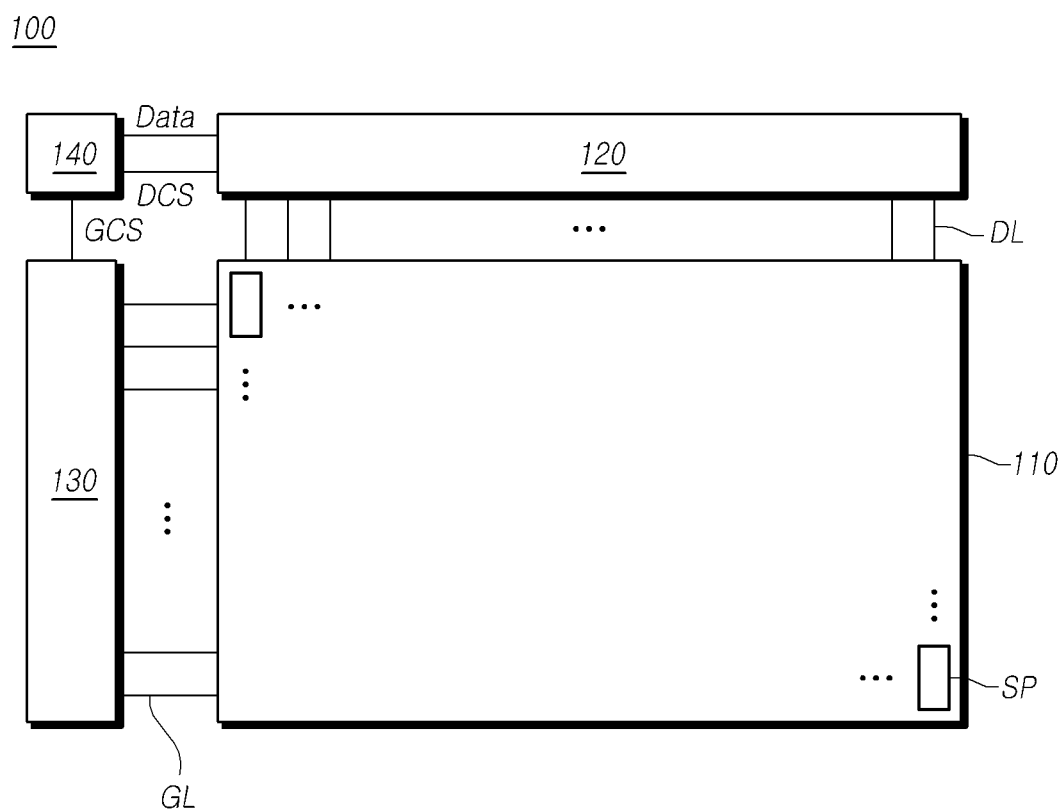
FIG. 1 is a diagram schematically illustrating a system configuration of a light emitting display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element.

Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a system configuration of a light emitting display device 100 according to embodiments of the present disclosure.

Referring to FIG. 1, a light emitting display device 100 according to embodiments of the present disclosure includes a light emitting display panel 110 in which a plurality of data lines DL and a plurality of reference voltage lines RVL are arranged in a first direction (for example, a column direction), a plurality of gate lines GL are arranged in a second direction (for example, a row direction), and a plurality of subpixels SP formed adjacent to the plurality of data lines DL and the plurality of gate lines GL which are arranged in a matrix type, a data driver 120 that drives the plurality of data lines DL, a gate driver 130 that drives the plurality of gate lines GL, and a display controller 140 that controls the data driver 120 and the gate driver 130.

The display controller 140 supplies various control signals to the data driver 120 and the gate driver 130 and controls the data driver 120 and the gate driver 130.

The display controller 140 starts scanning at timings which are realized in each frame, converts input image data which is input from the outside to correspond to a data signal format which is used in the data driver 120, outputs the converted image data, and controls data driving at appropriate timings to correspond to the scanning.

The display controller 140 may be a timing controller that is used for normal display technology or may be a control device that performs other control functions in addition to the function of the timing controller.

The data driver 120 drives the plurality of data lines DL by supplying a data voltage to the plurality of data lines DL. Here, the data driver 120 is also referred to as a "source driver."

The data driver 120 may include at least one source driver integrated circuit SDIC and drive the plurality of data lines.

The gate driver 130 sequentially drives the plurality of gate lines GL by sequentially supplying a scan signal to the plurality of gate lines GL. Here, the gate driver 130 is also referred to as a "scan driver."

The gate driver 130 may include at least one gate driver integrated circuit GDIC.

The gate driver 130 sequentially supplies a scan signal of an ON voltage or an OFF voltage to the plurality of gate lines GL under the control of the display controller 140.

When a specific gate line is opened by the gate driver 130, the data driver 120 converts image data Data received from the display controller 140 into an analog data voltage Vdata and supplies the data voltage to the plurality of data lines DL.

The data driver 120 is located on only one side (for example, an upper side or a lower side) of the light emitting display panel 110 in FIG. 1, but may be located on both sides (for example, an upper side and a lower side) of the light emitting display panel 110 depending on a driving system, a panel design system, or the like.

The gate driver 130 is located on only one side (for example, a right side or a left side) of the light emitting display panel 110 in FIG. 1, but may be located on both sides (for example, a right side and a left side) of the light emitting display panel 110 depending on a driving system, a panel design system, or the like.

The display controller 140 receives various timing signals including a vertical synchronization signal Vsync, a horizontal synchronization signal Hsync, an input data enable signal DE, and a clock signal CLK in addition to input image data from the outside (for example, a host system).

In order to control the data driver 120 and the gate driver 130, the display controller 140 receives timing signals such as a vertical synchronization signal Vsync, a horizontal synchronization signal Hsync, an input DE signal, and a clock signal CLK, generates various control signals, and outputs the generated control signals to the data driver 120 and the gate driver 130.

For example, the display controller 140 outputs various gate control signals GCS including a gate start pulse GSP, a gate shift clock GSC, and a gate output enable signal GOE in order to control the gate driver 130.

Here, the gate start pulse GSP controls an operation start timing of one or more gate driver integrated circuits of the gate driver 130. The gate shift clock GSC is a clock signal which is input commonly to the one or more gate driver integrated circuits and controls a shift timing of a scan signal (a gate pulse). The gate output enable signal GOE designates timing information of the one or more gate driver integrated circuits.

The display controller 140 outputs various data control signals DCS including a source start pulse SSP, a source sampling clock SSC, and a source output enable signal SOE in order to control the data driver 120.

Here, the source start pulse SSP controls a data sampling start timing of one or more source driver integrated circuits of the data driver 120. The source sampling clock SSC is a clock signal for controlling sampling timings of data in the one or more source driver integrated circuits. The source output enable signal SOE controls an output timing of the data driver 120.

The data driver 120 includes at least one source driver integrated circuit SDIC and drives the plurality of data lines.

Each source driver integrated circuit SDIC may be connected to a bonding pad of the light emitting display panel 110 in a tape automated bonding (TAB) system or a chip on glass (COG) system, may be disposed directly on the light emitting display panel 110, or may be integrated and disposed on the light emitting display panel 110 in some cases. Each source driver integrated circuit SDIC may be realized in a chip on film (COF) system in which it is mounted on a film connected to the light emitting display panel 110.

Each source driver integrated circuit SDIC may include a shift register, a latch circuit, a digital-to-analog converter DAC, and an output buffer.

Each source driver integrated circuit SDIC may further include an analog-to-digital converter ADC in some cases.

The gate driver 130 includes at least one gate driver integrated circuit GDIC.

Each gate driver integrated circuit GDIC may be connected to a bonding pad of the light emitting display panel 110 in a tape automated bonding (TAB) system or a chip on glass (COG) system, may be realized in a gate in panel (GIP) system and disposed directly on the light emitting display panel 110, or may be integrated and disposed on the light emitting display panel 110 in some cases. Each gate driver integrated circuit GDIC may be realized in a chip on film (COF) system in which it is mounted on a film connected to the light emitting display panel 110.

Each gate driver integrated circuit GDIC includes a shift register and a level shifter.

The light emitting display device 100 according to the embodiments of the present disclosure may include at least one source printed circuit board S-PCB for circuitry connection of at least one source driver integrated circuit SDIC and a control printed circuit board C-PCB for mounting control components and various electrical devices.

At least one source driver integrated circuit SDIC may be mounted on at least one source printed circuit board S-PCB or a film on which at least one source driver integrated circuit SDIC is mounted may be connected thereto.

The display controller 140 that controls operations of the data driver 120, the gate driver 130, and the like, a power supply that supplies various voltages or currents to the light emitting display panel 110, the data driver 120, the gate driver 130, and the like or controls various voltages or currents which are supplied thereto, and the like may be mounted on the control printed circuit board C-PCB.

At least one source printed circuit board S-PCB and the control printed circuit board C-PCB may be connected to each other via at least one connection member.

Here, the connection member may be a flexible printed circuit, a flexible flat cable, or the like.

At least one source printed circuit board S-PCB and the control printed circuit board C-PCB may be integrated and embodied as a single printed circuit board.

Each subpixel SP which is arranged in the light emitting display panel 110 includes circuit elements such as a transistor.

For example, each subpixel SP includes circuit elements such as an organic light emitting diode OLED and a driving transistor that drives the organic light emitting diode OLED.

The types and numbers of circuit elements of each subpixel SP can be determined variously depending on functions, design systems, and the like. In this specification, each subpixel may have a 3-transistors (3T) 1-capacitor (1C) structure including three transistors and one capacitor or a 2T1C structure including two transistors and one capacitor.

Figure 2:
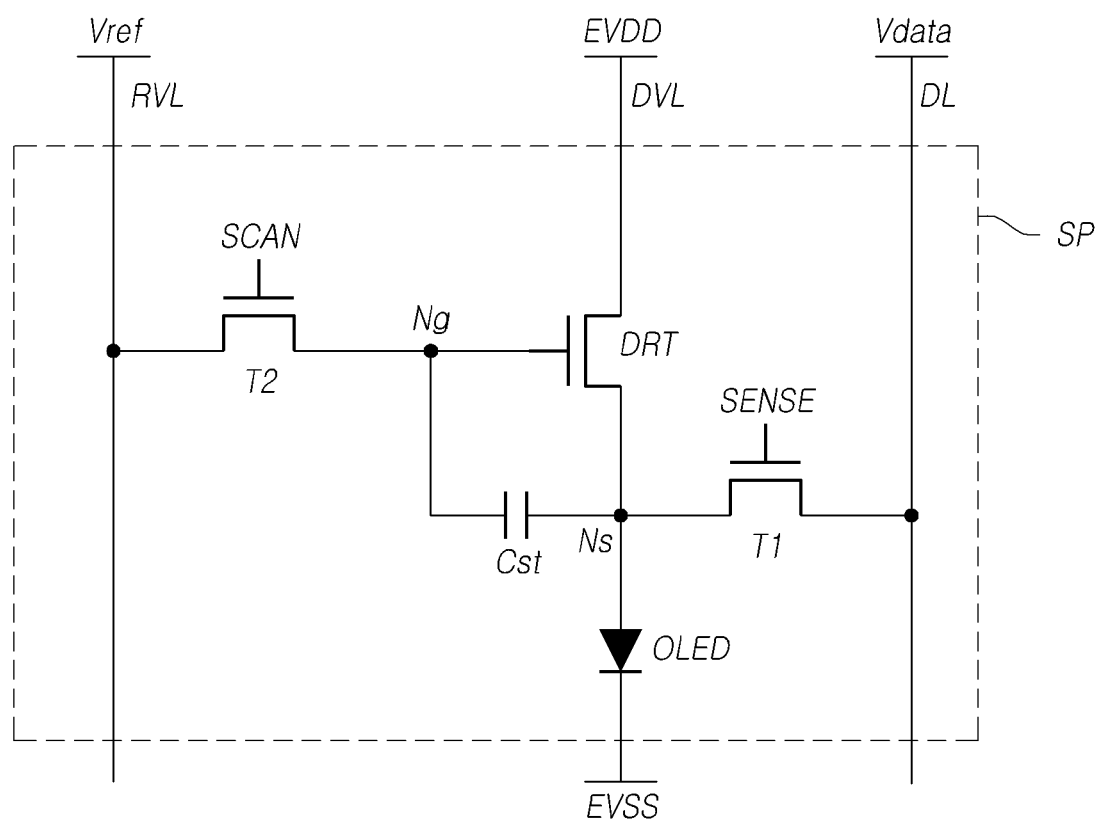
FIG. 2 is a diagram illustrating a 3T1C structure of each subpixel in a light emitting display panel according to the embodiments of the present disclosure.
Figure 3:
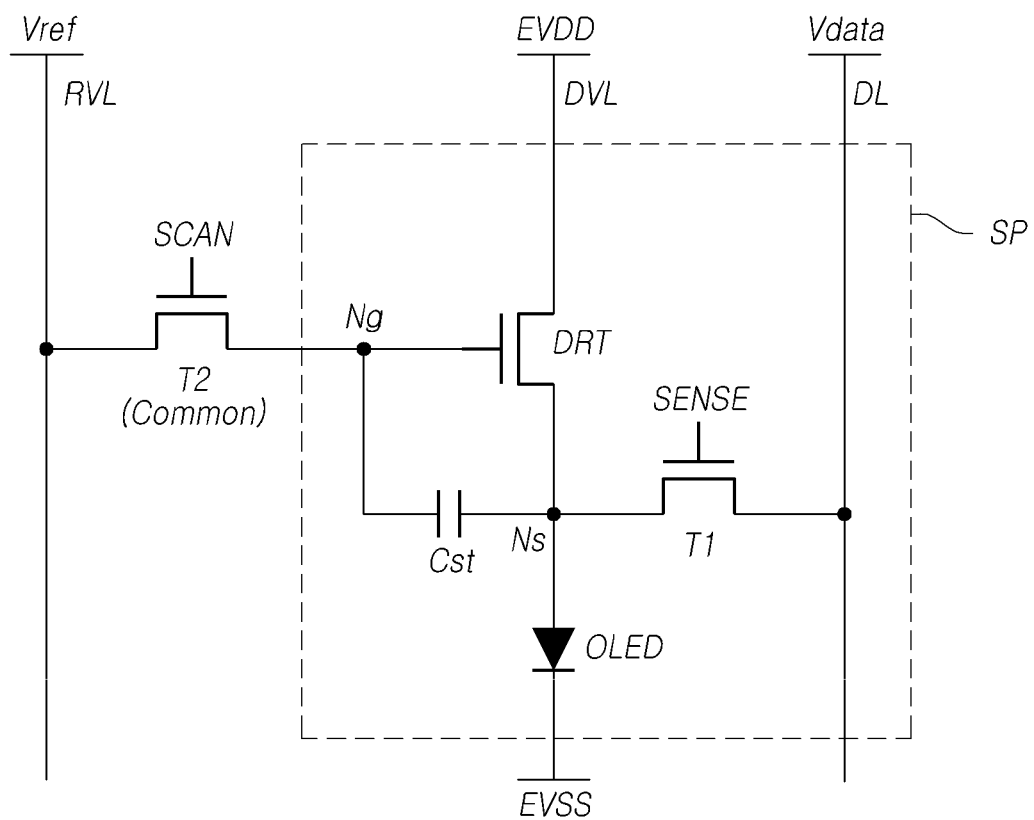
FIG. 3 is a diagram illustrating a 2T1C structure of each subpixel in a light emitting display panel according to the embodiments of the present disclosure.

FIG. 2 is a diagram illustrating a 3T1C structure of each subpixel SP in the light emitting display panel 110 according to the embodiments of the present disclosure. FIG. 3 is a diagram illustrating a 2T1C structure of each subpixel SP in the light emitting display panel 110 according to the embodiments of the present disclosure.

Referring to FIGS. 2 and 3, in the light emitting display panel 110 according to the embodiments of the present disclosure, each subpixel SP having a 3T1C structure or a 2T1C structure commonly includes an organic light emitting diode OLED, a driving transistor DRT that drives the organic light emitting diode OLED, a first transistor T1 that is controlled in accordance with a sensing signal SENSE which is a gate signal and is electrically connected between a source node Ns of the driving transistor DRT and the corresponding data line DL, and a storage capacitor Cst that is electrically connected between the gate node Ng and the source node Ns of the driving transistor DRT.

On the other hand, in the light emitting display panel 110 in which subpixels SP having a 3T1C structure as illustrated in FIG. 2 or a 2T1C structure as illustrated in FIG. 3 are arranged in a matrix type, a second transistor T2 that is controlled in accordance with a scan signal SCAN which is a gate signal and transmits a reference voltage Vref which is supplied via the reference voltage line RVL to the gate node Ng of the driving transistor DRT of each subpixel SP may be provided.

The voltage state of the gate node Ng of the driving transistor DRT can be controlled via the second transistor T2 and it is possible to efficiently control driving of the subpixels and to enable various driving of the subpixels.

The organic light emitting diode OLED includes a first electrode (for example, an anode electrode), an organic layer, and a second electrode (for example, a cathode electrode). An encapsulation layer may be disposed on the second electrode (for example, the cathode electrode) of the organic light emitting diode OLED.

The driving transistor DRT drives the organic light emitting diode OLED by supplying a driving current to the organic light emitting diode OLED.

In the driving transistor DRT, the source node is electrically connected to the first electrode of the organic light emitting diode OLED and can be electrically connected to the source node (or the drain node) of the first transistor T1, the drain node can be electrically connected to a drive voltage line DVL that supplies a drive voltage EVDD, and the gate node can be electrically connected to the source node (or the drain node) of the second transistor T2.

As illustrated in FIGS. 2 and 3, in a subpixel SP having a 3T1C structure and a subpixel SP having a 2T1C structure, the source node Ns of the driving transistor DRT is supplied with a data voltage Vdata via the data line DL, and the gate node Ng of the driving transistor DRT is supplied with a reference voltage Vref via the reference voltage line RVL.

As described above, each subpixel SP of the light emitting display panel 110 according to the embodiments of the present disclosure is different from a general subpixel structure, in that the driving transistor DRT that drives the organic light emitting diode OLED is supplied with the data voltage Vdata via the source node Ns instead of the gate node Ng and is supplied with the reference voltage Vref via the gate node Ng instead of the source node Ns.

By this particular subpixel structure, the reference voltage line RVL that transmits the reference voltage Vref corresponding to a common voltage is not provided for each subpixel column but for every a plurality of subpixel columns as will be described later and thus it is possible to significantly reduce a sensing time.

On the other hand, the second transistor T2 may be provided for each subpixel SP. In this case, each subpixel SP has a 3T1C structure as illustrated in FIG. 2.

Referring to FIG. 2, the second transistor T2 which is provided for each subpixel SP is electrically connected between the gate node Ng of the driving transistor DRT and the reference voltage line RVL.

When the second transistor T2 is turned on, the reference voltage Vref which is supplied via the reference voltage line RVL is applied to the gate node Ng of the driving transistor DRT.

As described above, by disposing the second transistor T2 that transmits the reference voltage Vref to the gate node Ng of the driving transistor DRT for each subpixel SP, it is possible to control the voltage of the gate node Ng of the driving transistor DRT by subpixels and thus to efficiently control driving of each subpixel.

On the other hand, referring to FIG. 3, the second transistor T2 may be provided for every two or more subpixels SP or may be provided for each reference voltage line RVL. In this case, each subpixel SP has a 2T1C structure as illustrated in FIG. 3.

In this way, by providing the second transistor T2 that transmits the reference voltage Vref to the gate node Ng of the driving transistor DRT for every two or more subpixels SP or for each reference voltage line RVL instead of providing the second transistor T2 for each subpixel SP, it is possible to greatly reduce the number of transistors in the light emitting display panel 110 and thus to enhance an aperture ratio of the light emitting display panel 110.

On the other hand, in FIGS. 2 and 3, the driving transistor DRT, the first transistor T1, and the second transistor T2 may be embodied as an n type or may be embodied as a p type.

On the other hand, the scan signal SCAN and the sensing signal SENSE may be separate gate signals. In this case, the scan signal SCAN and the sensing signal SENSE may be supplied to the gate node of the second transistor T2 and the gate node of the first transistor T1 via different gate lines, respectively.

In some cases, the scan signal SCAN and the sensing signal SENSE may be the same gate signal. In this case, the scan signal SCAN and the sensing signal SENSE may be commonly supplied to the gate node of the second transistor T2 and the gate node of the first transistor T1 via the same gate line.

The storage capacitor Cst is not a parasitic capacitor (for example, Cgs or Cgd) which is an internal capacitor between the first node and the second node of the driving transistor DRT but is an external capacitor which is intentionally designed outside the driving transistor DRT.

Figure 4:
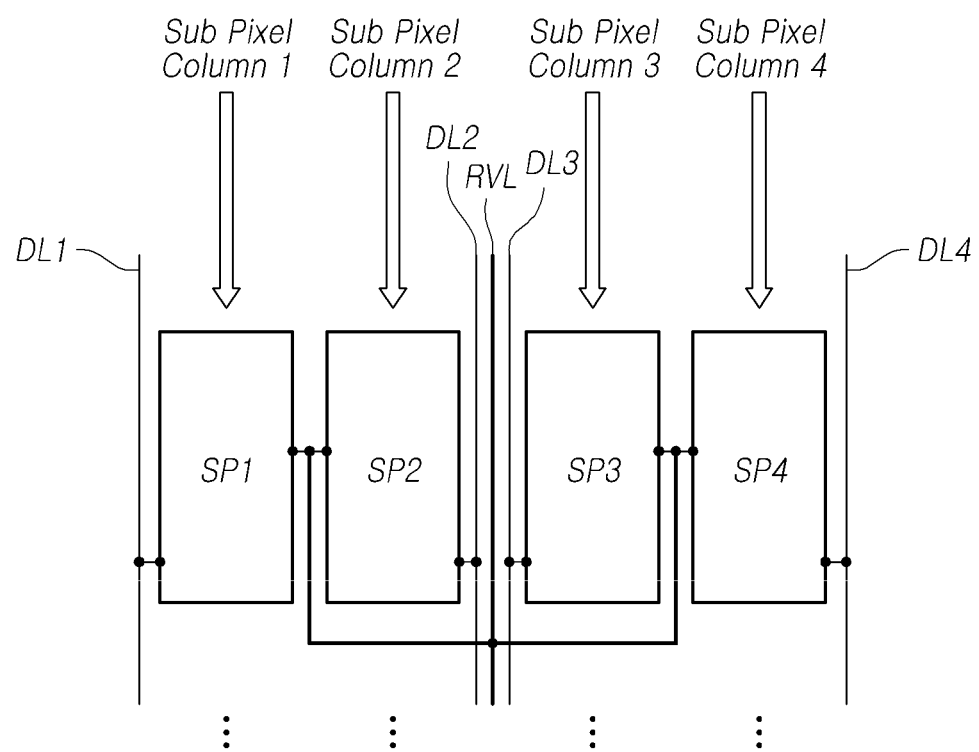
FIG. 4 is a diagram illustrating an example in which signal lines in a column direction are arranged for four subpixels in the light emitting display panel according to the embodiments of the present disclosure.

FIG. 4 is a diagram illustrating an example in which signal lines DL1, DL2, DL3, DL4, and RVL in the column direction are arranged for four subpixels SP in the light emitting display panel 110 according to the embodiments of the present disclosure.

The reference voltage line RVL is a signal line in the column direction that transmits the reference voltage Vref corresponding to a common voltage and is provided for each subpixel column, but may be provided for every two or more subpixel columns for the enhancement of driving efficiency.

When the reference voltage line RVL is provided for every two or more subpixel columns, one reference voltage line RVL may be provided for four subpixel columns, for example, as illustrated in FIG. 4.

In FIG. 4, four subpixels SP1, SP2, SP3, and SP4 are four subpixels belonging to four subpixel columns, respectively.

Here, four subpixels SP1, SP2, SP3, and SP4 may be, for example, a subpixel that emits red light, a subpixel that emits white light, a subpixel that emits blue light, and a subpixel that emits green light.

Referring to FIG. 4, four subpixels SP1, SP2, SP3, and SP4 are electrically connected to four data lines DL1, DL2, DL3, and DL4, respectively.

In this case, in the subpixel SP1, the first transistor T1 transmits the data voltage supplied via the data line DL1 to the source node Ns of the driving transistor DRT. In the subpixel SP2, the first transistor T1 transmits the data voltage supplied via the data line DL2 to the source node Ns of the driving transistor DRT. In the subpixel SP3, the first transistor T1 transmits the data voltage supplied via the data line DL3 to the source node Ns of the driving transistor DRT. In the subpixel SP4, the first transistor T1 transmits the data voltage supplied via the data line DL4 to the source node Ns of the driving transistor DRT.

Referring to FIG. 4, four subpixels SP1, SP2, SP3, and SP4 are commonly connected to one reference voltage line RVL. That is, one reference voltage line RVL is shared by four subpixels SP1, SP2, SP3, and SP4.

In this case, the gate nodes Ng of the driving transistors DRT of the four subpixels SP1, SP2, SP3, and SP4 are commonly supplied with the reference voltage Vref via one reference voltage line RVL.

The second transistor T2 that controls connection between the gate node Ng of the driving transistor DRT and the reference voltage line RVL is involved in supply of the reference voltage Vref.

The structures of the second transistor T2 and the reference voltage line RVL for supplying the reference voltage Vref to the gate node Ng of the driving transistor DRT in the cases in which four subpixels SP1, SP2, SP3, and SP4 have the 3T1C structure illustrated in FIG. 2 and the 2T1C structure illustrated in FIG. 3 when the reference voltage line RVL is provided for every four subpixel columns as illustrated in FIG. 4 will be described below in more detail with reference to FIGS. 5 and 6.

Figure 5:
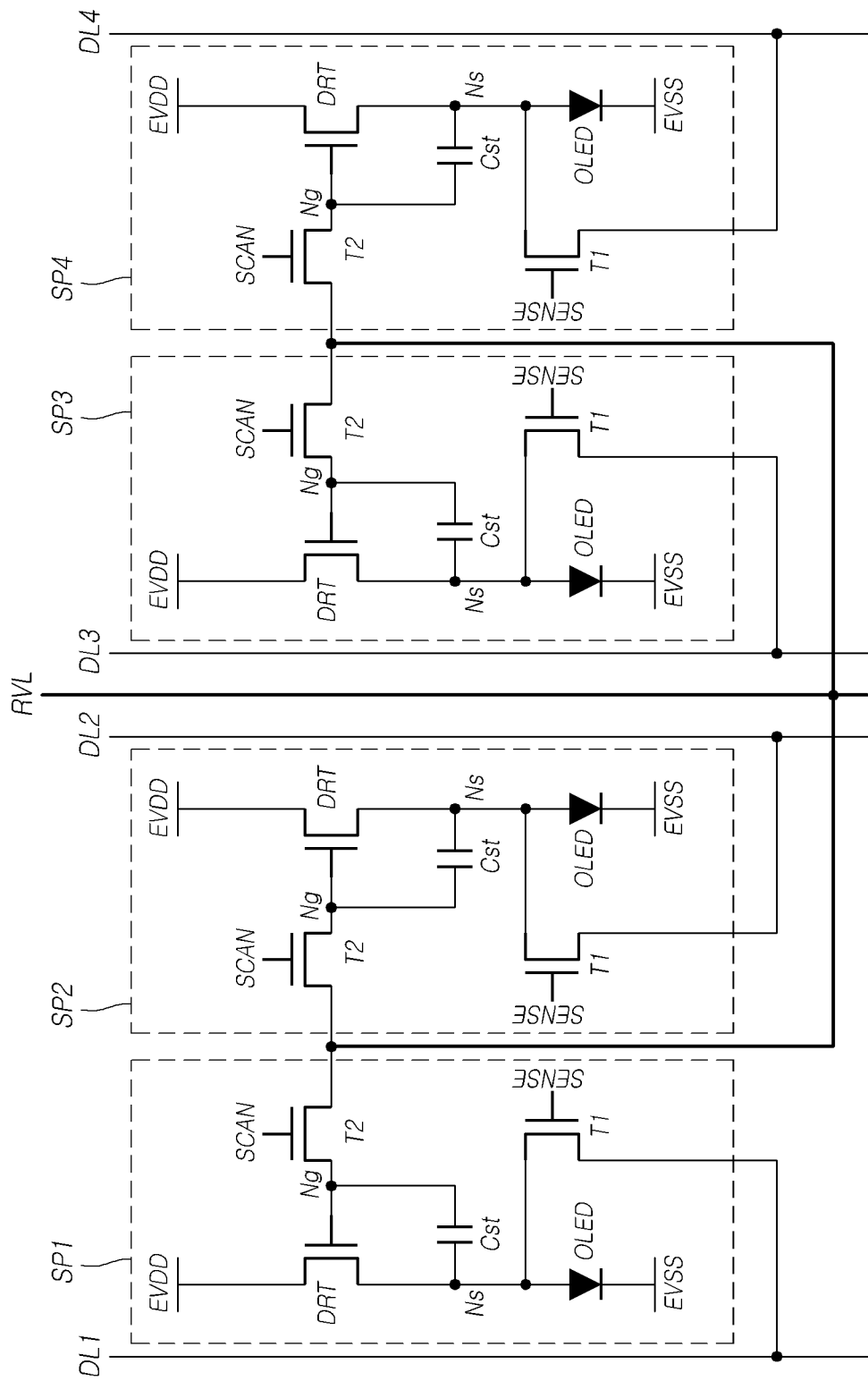
FIG. 5 is a diagram illustrating four subpixels having a 3T1C structure in the light emitting display panel according to the embodiments of the present disclosure.

FIG. 5 is a diagram illustrating four subpixels SP1, SP2, SP3, and SP4 having a 3T1C structure in the light emitting display panel 110 according to the embodiments of the present disclosure.

Referring to FIG. 5, each of four subpixels SP1, SP2, SP3, and SP4 has the 3T1C structure including three transistors DRT, T1, and T2 and one capacitor Cst as illustrated in FIG. 2.

Accordingly, when the reference voltage line RVL is provided for every four subpixel columns, each of four subpixels SP1, SP2, SP3, and SP4 includes the second transistor T2 in addition to the driving transistor DRT and the first transistor T1.

The second transistors T2 included in four subpixels SP1, SP2, SP3, and SP4 are commonly connected to one reference voltage line RVL.

The second transistor T2 of the subpixel SP1 is connected between the gate node Ng of the driving transistor DRT of the subpixel SP1 and the reference voltage line RVL. The second transistor T2 of the subpixel SP2 is connected between the gate node Ng of the driving transistor DRT of the subpixel SP2 and the reference voltage line RVL. The second transistor T2 of the subpixel SP3 is connected between the gate node Ng of the driving transistor DRT of the subpixel SP3 and the reference voltage line RVL. The second transistor T2 of the subpixel SP4 is connected between the gate node Ng of the driving transistor DRT of the subpixel SP4 and the reference voltage line RVL.

On the other hand, out of four subpixels SP1, SP2, SP3, and SP4, the drain node (or the source node) of the second transistor T2 of the first subpixel SP1 and the drain node (or the source node) of the second transistor T2 of the second subpixel SP2 are electrically connected to each other and are connected to the reference voltage line RVL.

Out of four subpixels SP1, SP2, SP3, and SP4, the drain node (or the source node) of the second transistor T2 of the third subpixel SP3 and the drain node (or the source node) of the second transistor T2 of the fourth subpixel SP4 are electrically connected to each other and are connected to the reference voltage line RVL.

With the structure illustrated in FIG. 5, even when the reference voltage Vref is supplied via the reference voltage line RVL, it is possible to individually control driving of the four subpixels SP1, SP2, SP3, and SP4 by individually controlling ON and OFF of the second transistors T2 of the fourth subpixels SP1, SP2, SP3, and SP4.

Figure 6:
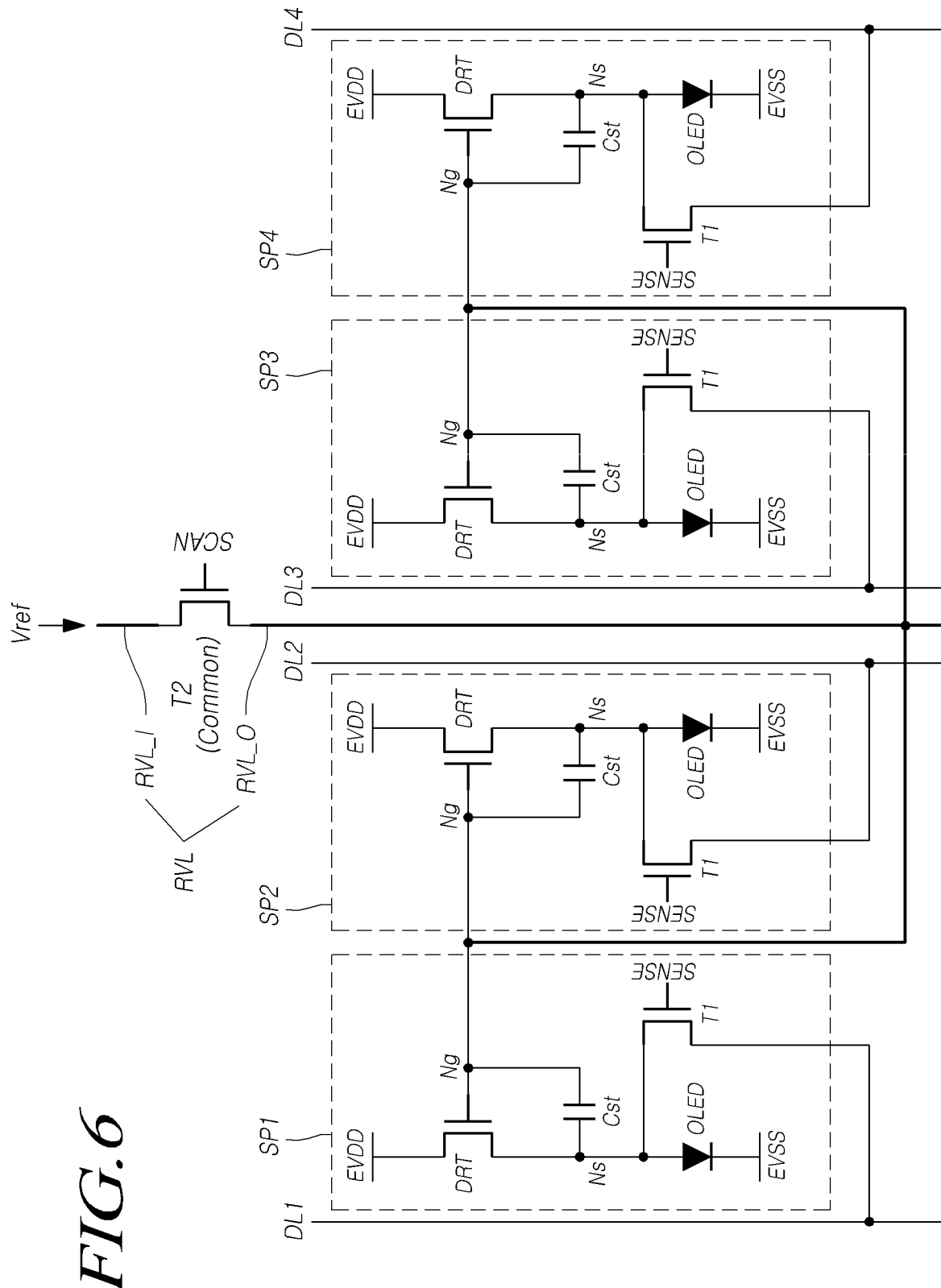
FIG. 6 is a diagram illustrating four subpixels having a 2T1C structure in the light emitting display panel according to the embodiments of the present disclosure.

FIG. 6 is a diagram illustrating four subpixels SP1, SP2, SP3, and SP4 having a 2T1C structure in the light emitting display panel 110 according to the embodiments of the present disclosure.

Referring to FIG. 6, each of four subpixels SP1, SP2, SP3, and SP4 has the 2T1C structure including two transistors DRT and T1 and one capacitor Cst as illustrated in FIG. 3.

Accordingly, when the reference voltage line RVL is provided for every four subpixel columns, each of four subpixels SP1, SP2, SP3, and SP4 includes the driving transistor DRT and the first transistor T1 but does not individually include the second transistor T2.

In this case, the reference voltage line RVL is provided for every four subpixel columns and includes a first part RVL_I which is supplied with the reference voltage Vref and a second part RVL_O that supplies the reference voltage Vref to the four subpixels SP1, SP2, SP3, and SP4.

The gate nodes Ng of the driving transistors DRT of four subpixels SP1, SP2, SP3, and SP4 are commonly connected to the second part RVL_O of one reference voltage line RVL.

The second transistor T2 which is commonly used to supply the reference voltage Vref to the gate nodes Ng of the driving transistors DRT is electrically connected between the first part RVL_I of one reference voltage line RVL and the second part RVL_O of the reference voltage line RVL.

The second transistor T2 may be provided for each reference voltage line RVL or may be provided for each subpixel column in one reference voltage line RVL.

As described above, by disposing one second transistor T2 which is commonly used for four subpixels SP1, SP2, SP3, and SP4 on one reference voltage line RVL in order to transmit the reference voltage Vref to the gate nodes Ng of the driving transistors DRT of four subpixels SP1, SP2, SP3, and SP4, all the subpixels in the light emitting display panel 110 do not need to include the second transistor R2 and thus it is possible to greatly reduce the number of second transistors T2. Accordingly, it is possible to much enhance the aperture ratio of the light emitting display panel 110.

On the other hand, one second transistor T2 which is commonly used may be considered as a transistor which is included in one of four subpixels SP1, SP2, SP3, and SP4.

In this case, one subpixel which is considered to include the second transistor T2 out of four subpixels SP1, SP2, SP3, and SP4 has a 3T1C structure and the other three subpixels has a 2T1C structure.

Figure 7:
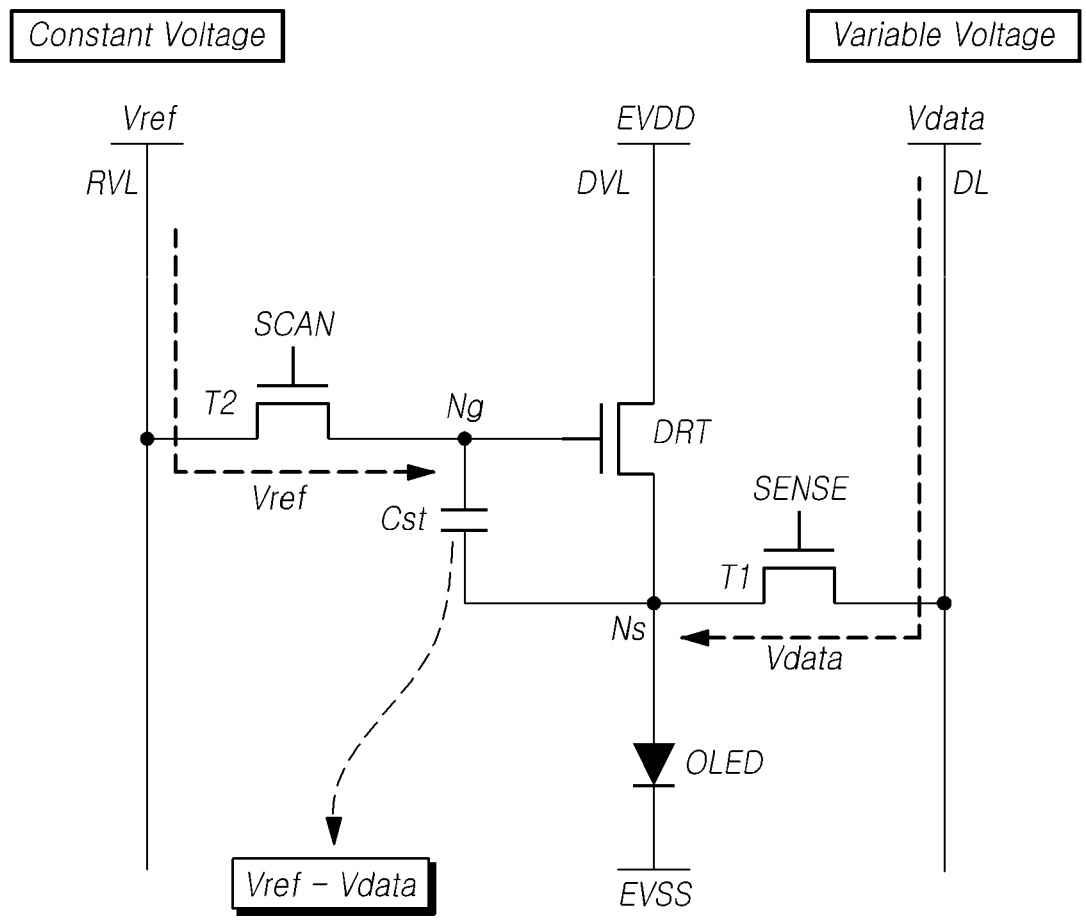
FIGS. 7 to 9 are diagrams illustrating an image driving system of the light emitting display device according to the embodiments of the present disclosure.
Figure 8:
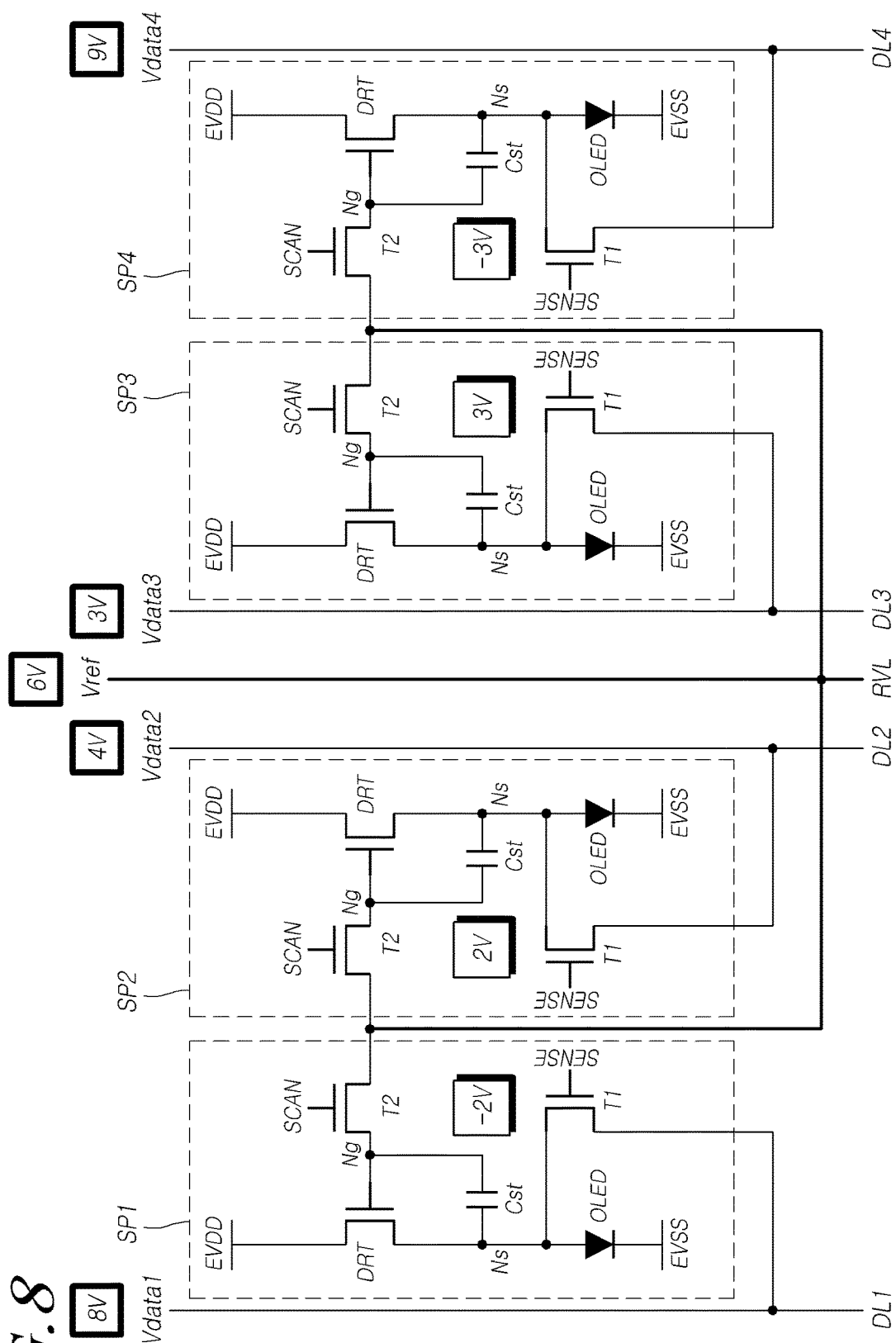
Figure 9:
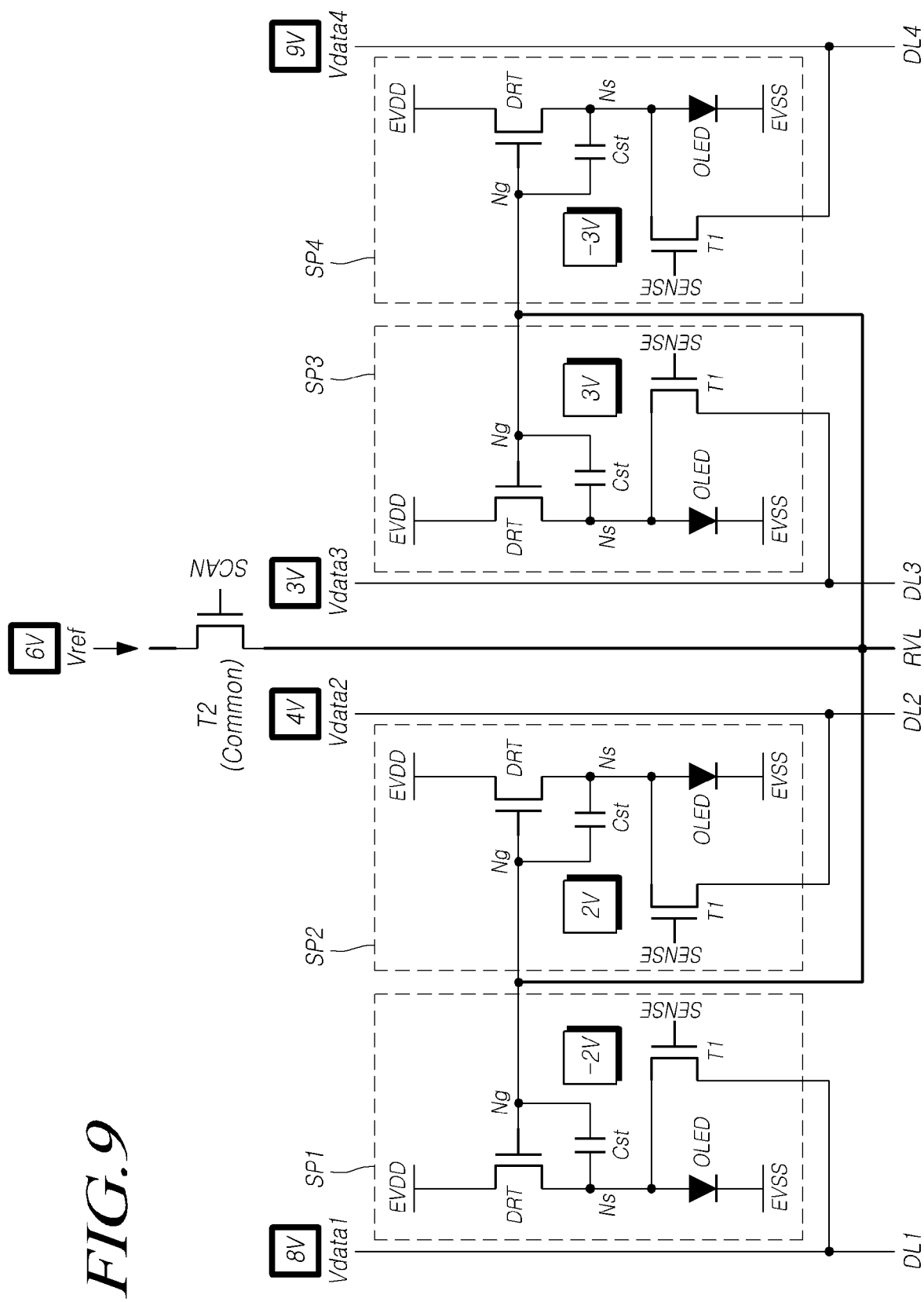

FIGS. 7 to 9 are diagrams illustrating an image driving system of the light emitting display device 100 according to the embodiments of the present disclosure.

Referring to FIG. 7, the source node Ns of the driving transistor DRT is supplied with a data voltage Vdata which is a variable voltage varying depending on an image pattern, the gate node Ng of the driving transistor DRT is supplied with a reference voltage Vref which is a constant voltage, and an image can be displayed using a potential difference Vref-Vdata at both ends of the storage capacitor Cst.

This is different from that in a general light emitting display device in which the gate node Ng of the driving transistor DRT is supplied with a data voltage Vdata which is a variable voltage varying depending on an image pattern and the source node Ns of the driving transistor DRT is supplied with a reference voltage Vref which is a constant voltage to display an image.

An example in which four subpixels SP1, SP2, SP3, and SP4 are driven on the basis of the above-mentioned image driving system will be described below with reference to FIGS. 8 and 9.

According to the embodiments of the present disclosure, when 8 V, 4 V, 3 V, and 9 V as four data voltages Vdata1, Vdata2, Vdata3, and Vdata4 are supplied to the gate nodes Ng of the driving transistors DRT of four subpixels SP1, SP2, SP3, and SP4 and 6 V as the common reference voltage Vref is supplied to the source nodes Ns of the driving transistors of the four subpixels SP1, SP2, SP3, and SP4, the potential differences Vref-Vdata1, Vref-Vdata2, Vref-Vdata3, and Vref-Vdata4 at both ends of the storage capacitors Cst of the four subpixels SP1, SP2, SP3, and SP4 are made to be −2 V, 2 V, 3 V, and −3 V and thus a desired image can be displayed.

On the other hand, in the light emitting display device 100 according to the embodiments of the present disclosure, as a driving time of each subpixel SP increases, degradation of the circuit elements such as the organic light emitting diodes OLED and the driving transistors DRT progresses.

Accordingly, unique characteristic values (for example, a threshold voltage and an electron mobility) of the circuit elements such as the organic light emitting diodes OLED and the driving transistors DRT vary.

The degree of variation in characteristic values of the circuit elements may differ depending on the degrees of degradation of the circuit elements.

In this case, a deviation in characteristic values may occur in the circuit elements and a deviation in luminance may occur in the subpixels.

Accordingly, there may be problems in that accuracy for luminance expression of a subpixel will degrade or image defects will be caused.

The light emitting display device 100 according to the embodiments of the present disclosure provides a sensing function of sensing characteristic values or variations in characteristic values of the circuit elements (such as the driving transistors and the organic light emitting diodes) and a compensation function of compensating for a deviation in characteristic values in the circuit elements (such as the driving transistors and the organic light emitting diodes) using the sensing result.

Figure 10:
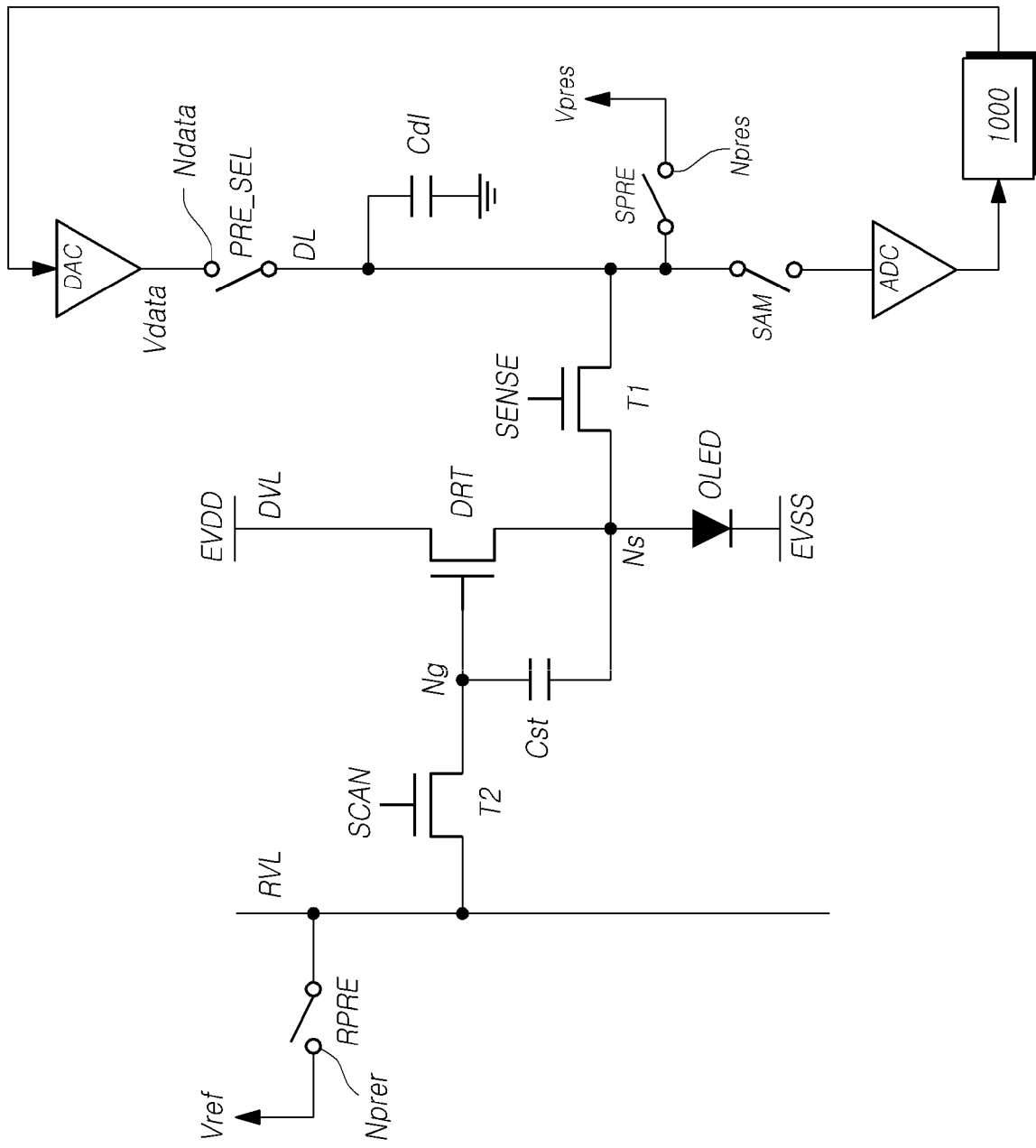
FIG. 10 is a diagram illustrating a compensation circuit of the light emitting display device according to the embodiments of the present disclosure.

The light emitting display device 100 according to the embodiments of the present disclosure may include a compensation circuit as illustrated in FIG. 10 to provide the sensing function and the compensation function.

FIG. 10 is a diagram illustrating a compensation circuit of the light emitting display device 100 according to the embodiments of the present disclosure.

Referring to FIG. 10, the compensation circuit of the light emitting display device 100 according to the embodiments of the present disclosure includes an analog-to-digital converter ADC that is electrically connected to the data line DL, senses a voltage (an analog voltage) of the data line DL, converts the sensed voltage into a sensing value corresponding to a digital value, and outputs sensing data including the converted sensing value and a compensation unit 1000 that reads sensing data or reads sensing data stored in a memory (not illustrated) and compensates for the characteristic values of the circuit elements (for example, threshold voltages or mobilities of the driving transistors and threshold voltages of the organic light emitting diodes) in the corresponding subpixel SP using the sensing data.

The characteristic value of the driving transistor DRT or the organic light emitting diode OLED in each subpixel can be sensed and compensated for using the compensation circuit. Accordingly, it is possible to prevent degradation in image quality due to deviations in characteristic values.

On the other hand, in the light emitting display device 100 according to the embodiments of the present disclosure, each data line DL serves as a "data signal line" that transmits a data voltage Vdata for image driving and can serve as a "sensing driving line" for supplying an initialization voltage Vpres for sensing driving to the source node Ns of the driving transistor DRT and a "sensing line" for transmitting the voltage of the source node Ns of the driving transistor DRT to the analog-to-digital converter ADC.

Accordingly, as illustrated in FIG. 10, the compensation circuit includes an initialization switch SPRE that is used to control whether the data line DL is to operate as the sensing driving line, a data switch PRE_SEL that is used to control whether the data line DL is to operate as a data signal line, and a sampling switch SAM that is used to control whether the data line DL is to operate as a sensing line.

The sampling switch SAM is electrically connected between the data line DL and the analog-to-digital converter ADC.

The sampling switch SAM is turned on to connect the data line DL to the analog-to-digital converter ADC when a specific time passes or a specific timing comes in.

Here, the specific time may be a selected time in which the voltage of the data line DL is predicted to become a voltage state in which the characteristic values of the driving transistor DRT or the organic light emitting diode OLED are reflected with the progress of sensing driving.

The specific timing may be a timing at which the voltage of the data line DL has been monitored to become a voltage state in which the characteristic values of the driving transistor DRT or the organic light emitting diode OLED are reflected with the progress of sensing driving.

The initialization switch SPRE is electrically connected between the data line DL and an initialization voltage supply node Npres.

The initialization switch SPRE is turned on in an initialization step of a sensing driving section to supply the initialization voltage Vpres from the initialization voltage supply node Npres to the data line DL and to supply the initialization voltage Vpres to the source node Ns of the driving transistor DRT via the turned-on first transistor T1.

The data switch PRE_SEL is electrically connected between the data line DL and a data voltage supply node Ndata.

The data switch PRE_SEL is turned on in an image driving section and supply the data voltage Vdata corresponding to an image signal from the data voltage supply node Ndata to the data line DL.

By controlling ON and OFF of the above-mentioned three switches PRE_SEL, SPRE, and SAM, the data line DL can operate as one of the data signal line, the sensing driving line, and the sensing line depending on the situation.

On the other hand, a line capacitor Cdl is present in the data line DL. The line capacitor Cdl is used to sense the characteristic values of the driving transistor DRT.

Referring to FIG. 10, the compensation circuit may further include a reference switch RPRE that is used to control whether the reference voltage Vref is to be supplied to the reference voltage line RVL.

The reference switch RPRE controls connection between the reference voltage supply node Nprer which is supplied with the reference voltage Vre and the reference voltage line RVL.

The reference switch RPRE can control the voltage state of the gate node Ng of the driving transistor DRT at the time of display driving (image driving) and/or sensing driving.

Figure 11:
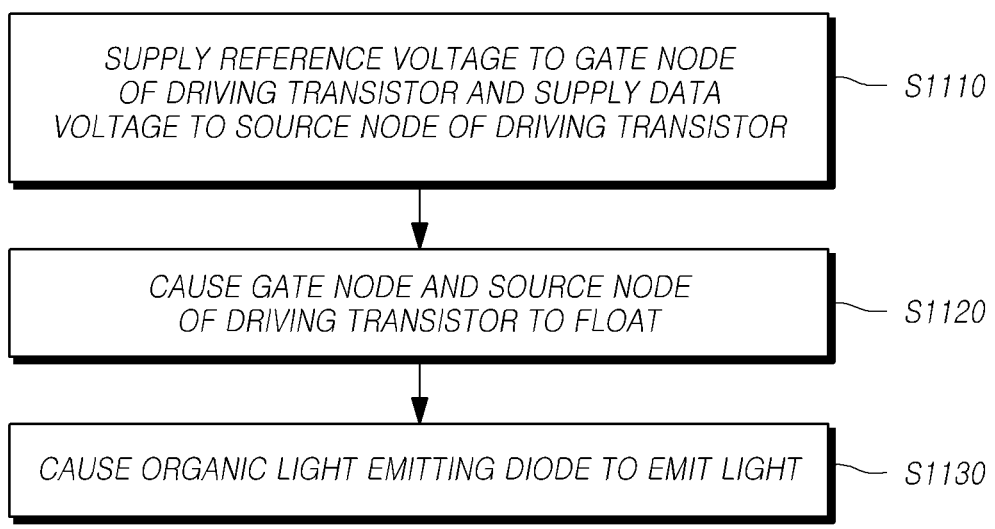
FIG. 11 is a flowchart illustrating an image driving method of the light emitting display device according to the embodiments of the present disclosure.

FIG. 11 is a flowchart illustrating an image driving method of the light emitting display device 100 according to the embodiments of the present disclosure.

Referring to FIG. 11, the image driving method of the light emitting display device 100 according to the embodiments of the present disclosure includes a first step S1110 of supplying a reference voltage Vref which is supplied via the reference voltage line RVL to the gate node of the driving transistor DRT and supplying a data voltage Vdata which is supplied via the data line DL to the source node Ns of the driving transistor DRT, a second step S1120 of causing the gate node Ng and the source node Ns of the driving transistor DRT to float, and a third step S1130 of causing the organic light emitting diode OLED to emit light.

According to the image driving method, the data voltage Vdata which is a variable voltage varying depending on an image pattern is supplied to the source node Ns of the driving transistor DRT, and the reference voltage Vref which is a constant voltage is supplied to the gate node Ng of the driving transistor DRT, and an image can be displayed using a potential difference Vref-Vdata between both ends of the storage capacitor Cst.

On the other hand, in the first step S1110, a sensing signal SENSE of a turn-on level is supplied to the gate node of the first transistor T1 connected between the data line DL and the source node Ns of the driving transistor DRT to turn on the first transistor T1, and the data switch PRE_SEL which is electrically connected between the data line DL and the data voltage supply node Ndata is turned on to supply the data voltage Vdata supplied via the data line DL to the source node Ns of the driving transistor DRT.

In the first step S1110, a scan signal SCAN of a turn-on level is supplied to the gate node of the second transistor T2 which is connected between the reference voltage line RVL and the gate node Ng of the diving transistor DRT to turn on the second transistor T2, and the reference switch RPRE is turned on to supply the reference voltage Vref supplied via the reference voltage line RVL to the gate node Ng of the driving transistor DRT.

In the second step S1120, the first transistor T1 or the data switch PRE_SEL is turned off to cause the source node Ns of the driving transistor DRT to float, and the second transistor T2 is turned off to cause the gate node Ng of the driving transistor DRT to float.

In the second step S1120, since the gate node Ng and the source node Ns of the driving transistor DRT float, the potential difference Vref-Vdata between the gate node Ng and the source node Ns of the driving transistor DRT is maintained and the voltages of the gate node Ng and the source node Ns of the driving transistor DRT increase together.

When the voltage of the source node Ns of the driving transistor DRT and the increased voltage of the source node Ns of the driving transistor DRT reaches a voltage state in which a current can be supplied to the organic light emitting diode OLED (a state in which the voltage is higher than a voltage obtained by adding the threshold voltage of the organic light emitting diode OLED to the base voltage EVSS), the third step S1130 is performed. That is, a current is supplied to the organic light emitting diode OLED to cause the organic light emitting diode OLED to emit light.

In the first step S1110, the data voltage Vdata supplied to the source node Ns of the driving transistor DRT has to be lower than the threshold voltage of the organic light emitting diode OLED.

Accordingly, the organic light emitting diode OLED does not emit light in the first step S1110, the organic light emitting diode OLED emits light through the second step S1120, that is, when the voltage of the source node Ns of the driving transistor DRT increases, and thus image reproducibility can be improved.

In the third step S1130, luminance which is displayed in the subpixel SP with emission of light from the organic light emitting diode OLED may be luminance corresponding to the difference Vref-Vdata between the reference voltage Vref supplied to the gate node Ng of the driving transistor DRT and the data voltage Vdata supplied to the source node Ns of the driving transistor DRT.

Figure 12:
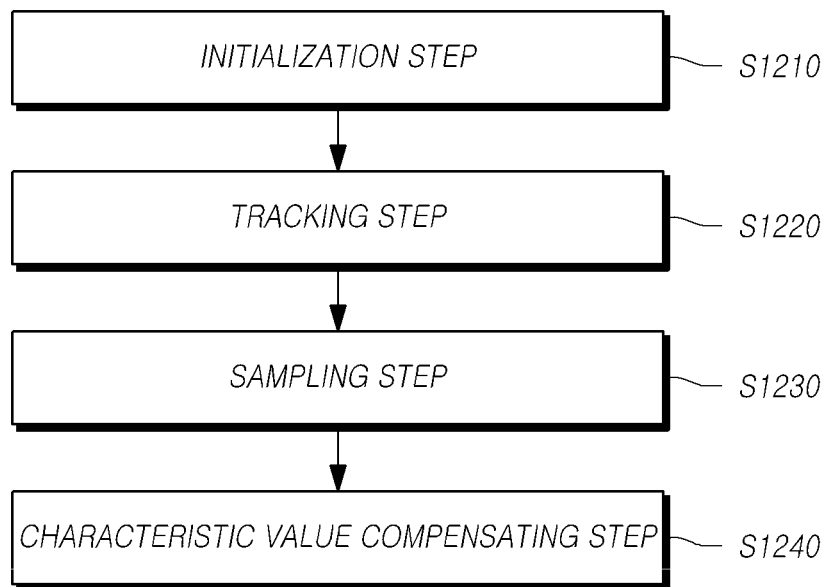
FIG. 12 is a flowchart illustrating a sensing method of the light emitting display device according to the embodiments of the present disclosure.

FIG. 12 is a flowchart illustrating a sensing method of the light emitting display device 100 according to the embodiments of the present disclosure.

Referring to FIG. 12, the sensing method in the light emitting display device 100 according to the embodiments of the present disclosure includes an initialization step S1210, a tracking step S1220, and a sampling step S1230.

In the initialization step S1210, the reference switch RPRE and the initialization switch SPRE are turned on to supply the reference voltage Vref which is supplied via the reference voltage line RVL to the gate node Ng of the driving transistor DRT and to supply the initialization voltage Vpres which is supplied via the data line DL to the source node Ns of the driving transistor DRT.

In the tracking step S1220, the source node Ns of the driving transistor DRT is caused to float and thus the voltage of the source node Ns of the driving transistor DRT increases.

In the tracking step S1220, the voltage of the source node Ns of the driving transistor DRT increases and a voltage state in which the characteristic values (for example, a threshold voltage and a mobility) of the driving transistor DRT or the characteristic values (for example, a threshold voltage) of the organic light emitting diode OLED are reflected is tracked.

When the voltage state in which the characteristic values (for example, a threshold voltage and a mobility) of the driving transistor DRT or the characteristic values (for example, a threshold voltage) of the organic light emitting diode OLED are reflected is achieved in the tracking step S1220, the sampling step S1230 is performed.

In the sampling step S1230, the analog-to-digital converter ADC and the data line DL are electrically connected. Accordingly, the analog-to-digital converter ADC senses the voltage of the data line DL.

According to this sensing method, by supplying the initialization voltage Vpres to the source node Ns of the driving transistor DRT and supplying the reference voltage Vref to the gate node of the driving transistor DRT to achieve a sensing driving initialized state, making the source node Ns of the driving transistor DRT along with the data line DL be in a desired voltage state, and sensing the voltage via the data line DL for each subpixel SP, sampling processes for the subpixels SP can be simultaneously performed. Accordingly, it is possible to greatly shorten the total sensing time of the light emitting display panel 110.

On the other hand, in the initialization step S1210, the first transistor T1 which is connected between the data line DL and the source node Ns of the driving transistor DRT is turned on using the sensing signal SENSE of a turn-on level, the initialization switch SPRE which is electrically connected between the data line DL and the initialization voltage supply node Npres is turned on, and the initialization voltage Vpres which is supplied via the data line DL is supplied to the source node Ns of the driving transistor DRT.

In the initialization step S1210, the second transistor T2 which is connected between the reference voltage line RVL and the gate node Ng of the driving transistor DRT is turned on and the reference voltage Vref which is supplied via the reference voltage line RVL is supplied to the gate node Ng of the driving transistor DRT.

In the tracking step S1220, the initialization switch SPRE is turned off to cause the source node Ns of the driving transistor DRT to float and the voltages of the source node Ns of the driving transistor DRT and the data line DL increase from the initialization voltage Vpres.

In the sampling step S1230, the sampling switch SAM which is electrically connected between the analog-to-digital converter ADC and the data line DL is turned on to electrically connect the analog-to-digital converter ADC to the data line DL.

Accordingly, the analog-to-digital converter ADC senses the voltage of the data line DL.

In the sampling step S1230, a sampling time point, that is, a turn-on time point of the sampling switch SAM, varies depending on a sensing driving type.

For example, in the case of sensing driving for sensing the threshold voltage of the driving transistor DRT, the sampling time point is set after a time point at which the voltage of the source node Ns of the driving transistor DRT has increased and has been saturated.

In the case of sensing driving for sensing the mobility of the driving transistor DRT, the sampling time point is set after a selected time has elapsed from a floating time point because only a time in which a voltage increase (a voltage change) of the source node Ns of the driving transistor DRT can be obtained has only to elapse from the floating time point.

Referring to FIG. 12, a characteristic value compensating step S1240 of compensating for the threshold voltage or the mobility of the driving transistor DRT on the basis of the voltage sensed by the analog-to-digital converter ADC is performed after the sampling step S1230.

In the characteristic value compensating step S1240, the threshold voltage or the mobility of the driving transistor DRT is detected on the basis of the sensed voltage, a threshold voltage deviation or a mobility deviation is acquired, and a compensation value for removing the deviation is calculated.

The compensation unit 1000 changes image data which is to be supplied to the corresponding subpixel SP on the basis of the calculated compensation value.

When the source driver integrated circuit SDIC converts the changed image data into a data voltage and outputs the converted data voltage, compensation for the threshold voltage or the mobility of the driving transistor DRT is actually performed.

Figure 13:
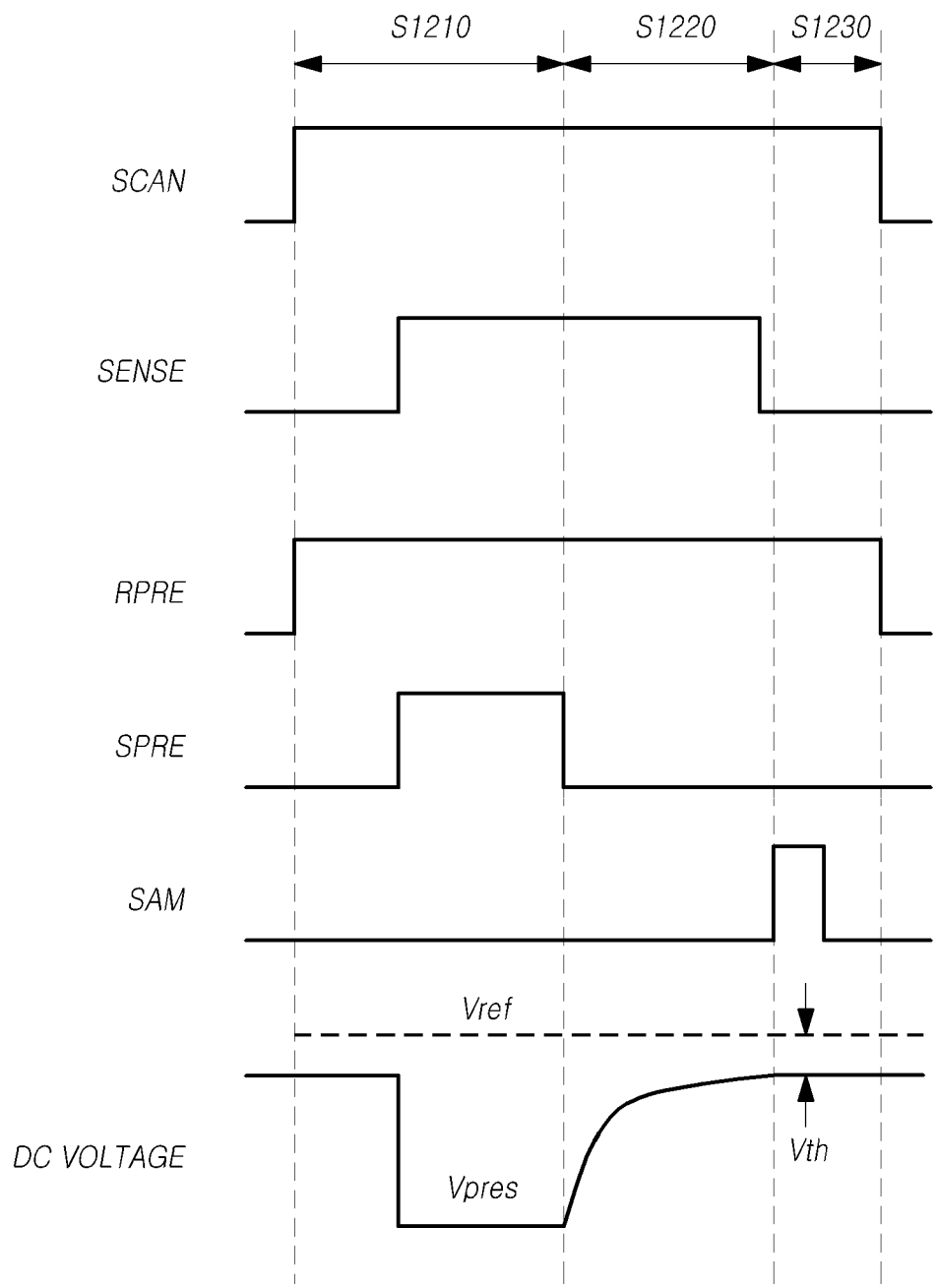
FIG. 13 is a timing diagram illustrating sensing a threshold voltage of a driving transistor in the light emitting display device according to the embodiments of the present disclosure.

FIG. 13 is a timing diagram illustrating sensing a threshold voltage of a driving transistor DRT in the light emitting display device 100 according to the embodiments of the present disclosure.

Referring to FIG. 13, in the initialization step S1210 of a threshold voltage sensing driving section, the first transistor T1 which is connected between the data line DL and the source node Ns of the driving transistor DRT is turned on using the sensing signal SENE of a turn-on level, the initialization switch SPRE which is electrically connected between the data line DL and the initialization voltage supply node Npres is turned on, and the initialization voltage Vpres which is supplied via the data line DL is supplied to the source node Ns of the driving transistor DRT.

In the initialization step S1210, the reference switch RPRE is turned on and the second transistor T2 which is connected between the reference voltage line RVL and the gate node Ng of the driving transistor DRT is turned on using the scan signal SCAN of a turn-on level to supply the reference voltage Vref which is supplied via the reference voltage line RVL to the gate node Ng of the driving transistor DRT.

Referring to FIG. 13, in the tracking step S1220, the initialization switch SPRE is turned off to cause the source node Ns of the driving transistor DRT to float.

Accordingly, the voltage of the source node Ns of the driving transistor DRT increases from the initialization voltage Vpres. At this time, the voltage of the data line DL increases together.

The voltage increase widths of the source node Ns of the driving transistor DRT and the data line DL are reduced over time and the voltages thereof are saturated.

When the voltages of the source node Ns of the driving transistor DRT and the data line DL are saturated, the sampling step S1230 is performed.

Referring to FIG. 13, when the sampling switch SAM is turned on at the sampling time point set after the voltages of the source node Ns of the driving transistor DRT and the data line DL have been saturated, the analog-to-digital converter ADC and the data line DL are electrically connected.

Accordingly, the analog-to-digital converter ADC senses the voltage of the data line DL.

When the threshold voltage Vth of the driving transistor DRT is a positive threshold voltage, the voltage Vsen sensed by the analog-to-digital converter ADC is a voltage Vref-Vth which is lower by the threshold voltage Vth of the driving transistor DRT than the reference voltage Vref supplied to the gate node Ng of the driving transistor DRT.

When the threshold voltage Vth of the driving transistor DRT is a negative threshold voltage, the voltage Vsen sensed by the analog-to-digital converter ADC is a voltage Vref+Vth which is higher by the threshold voltage Vth of the driving transistor DRT than the reference voltage Vref supplied to the gate node Ng of the driving transistor DRT.

Figure 14:
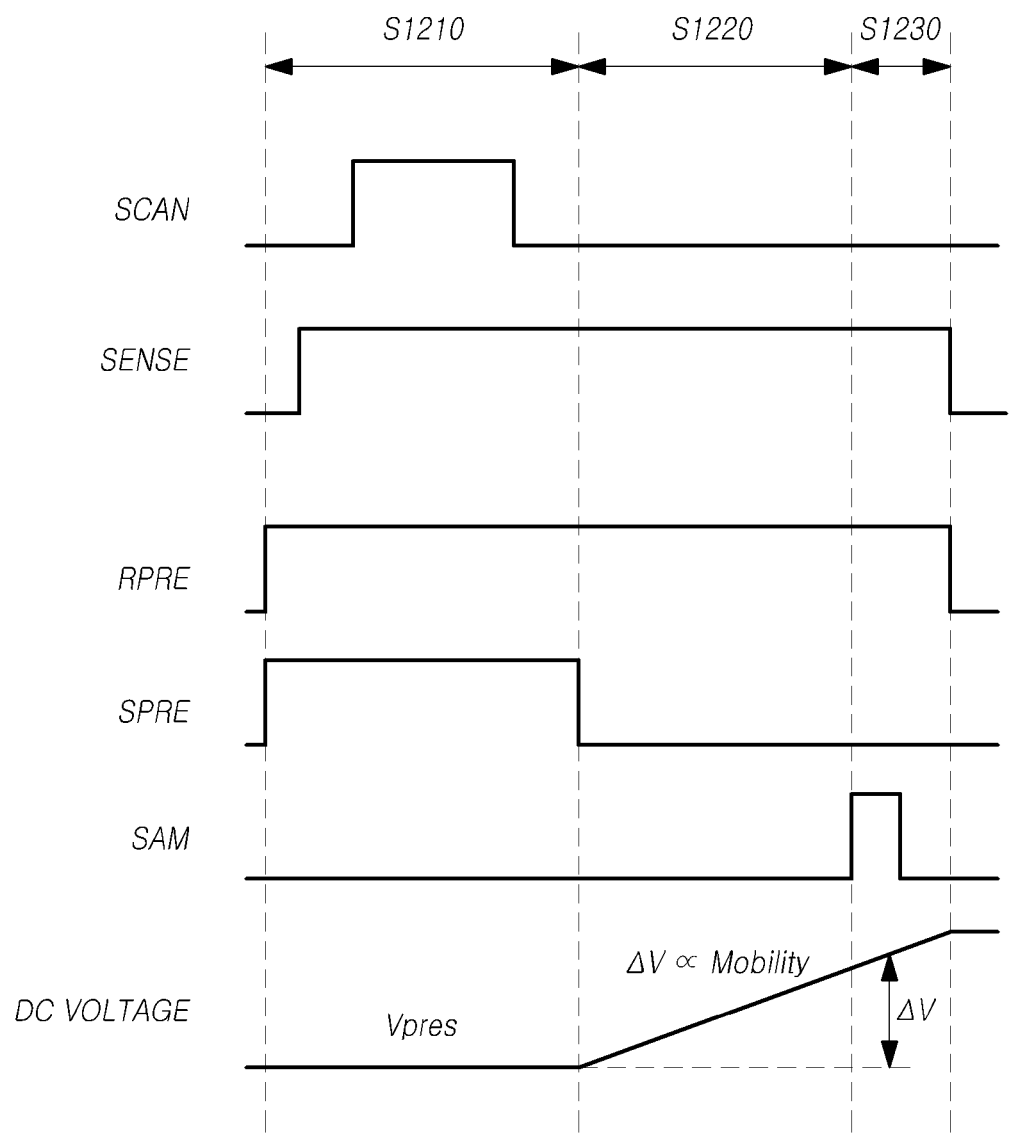
FIG. 14 is a timing diagram illustrating sensing a mobility of a driving transistor in the light emitting display device according to the embodiments of the present disclosure.

FIG. 14 is a timing diagram illustrating sensing a mobility of the driving transistor DRT in the light emitting display device 100 according to the embodiments of the present disclosure.

Referring to FIG. 14, in the initialization step S1210 of a mobility sensing driving section, the first transistor T1 which is connected between the data line DL and the source node Ns of the driving transistor DRT is turned on using the sensing signal SENSE of a turn-on level and the initialization switch SPRE which is electrically connected between the data line DL and the initialization voltage supply node Npres is turned on to supply the initialization voltage Vpres which is supplied via the data line DL to the source node Ns of the driving transistor DRT.

In the initialization step S1210, the reference switch RPRE is turned on and the second transistor T2 which is connected between the reference voltage line RVL and the gate node Ng of the driving transistor DRT is turned on using the scan signal SCAN of a turn-on level to supply the reference voltage Vref which is supplied via the reference voltage line RVL to the gate node Ng of the driving transistor DRT.

Referring to FIG. 14, in the tracking step S1220, the initialization switch SPRE is turned off to cause the source node Ns of the driving transistor DRT to float, and the scan signal SCAN of the second transistor T2 is switched to a turn-off voltage level to cause the gate node Ng of the driving transistor DRT to float.

Accordingly, the voltages of the gate node Ng and the source node Ns of the driving transistor DRT increase from the initialization voltage Vpres. At this time, the voltage of the data line DL increases together.

After the voltages of the gate node Ng and the source node Ns of the driving transistor DRT have increased for a selected time Δt, the sampling switch SAM is turned on.

Description will be continued with reference to FIG. 14.

After the voltages of the gate node Ng and the source node Ns of the driving transistor DRT have increased for a selected time Δt, the sampling switch SAM is turned on.

Accordingly, the analog-to-digital converter ADC is electrically connected to the data line DL and senses the voltage of the data line DL.

The compensation unit 1000 can calculate a voltage increase rate (a graph slope) by calculating a difference between the voltage Vsen sensed by the analog-to-digital converter ADC and the voltage Vpres before being increased as a voltage increase ΔV and dividing the calculated voltage increase Δt by the time Δt of the voltage increasing section.

The compensation unit 1000 can acquire the mobility (the current capability) of the driving transistor DRT from the calculated voltage increase rate.

Here, since the time Δt is fixed, the voltage change and the voltage increase rate are proportional to each other. The voltage increase rate is proportional to the mobility (the current capability) of the driving transistor DRT.

Figure 15:
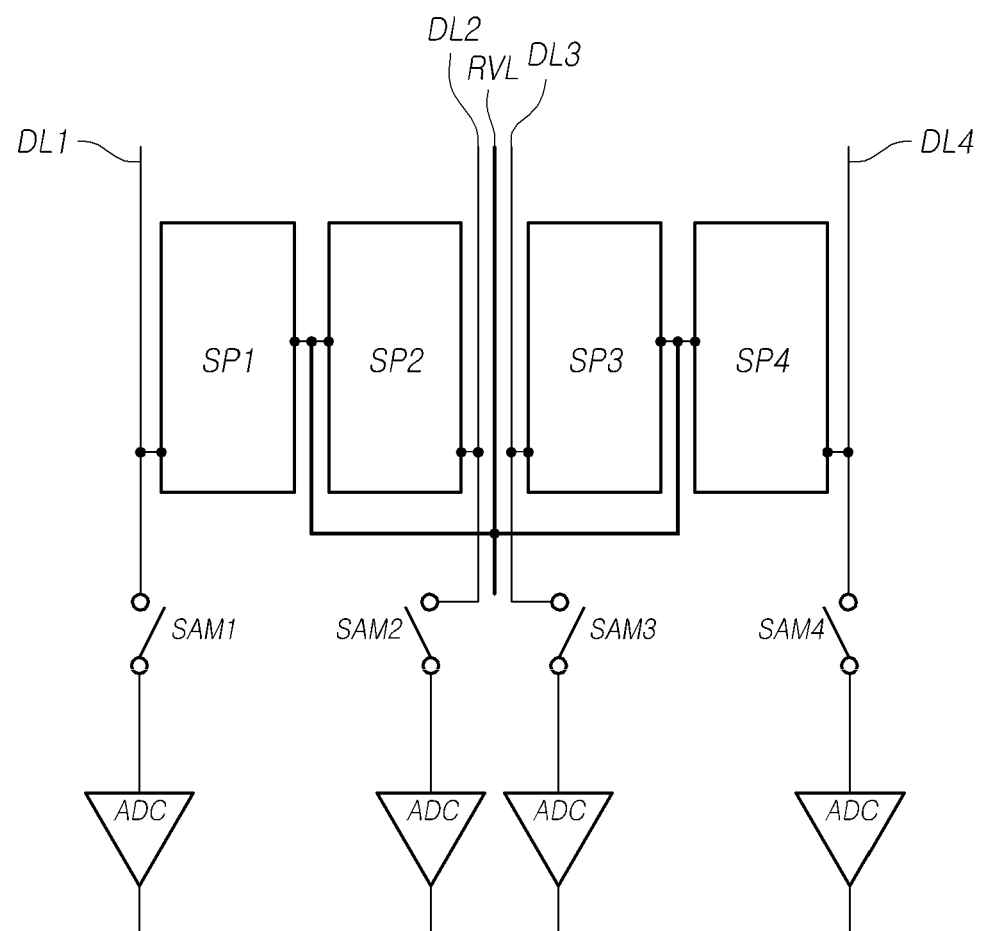
FIG. 15 is a diagram illustrating a sensing time saving effect in the light emitting display device according to the embodiments of the present disclosure.

FIG. 15 is a diagram illustrating a sensing time saving effect in the light emitting display device 100 according to the embodiments of the present disclosure.

Referring to FIG. 15, even when the reference voltage line RVL is shared by four subpixels SP1, SP2, SP3, and SP4 as described above, the analog-to-digital converter ADC can be electrically connected to four data lines DL1, DL2, DL3, and DL4 corresponding to the four subpixels SP1, SP2, SP3, and SP4.

Accordingly, it is possible to simultaneously sense the voltages of the data lines by simultaneously performing sensing driving on four subpixels SP1, SP2, SP3, and SP4 and simultaneously turning on four sampling switches SAM1, SAM2, SAM3, and SAM4. Accordingly, it is possible to greatly shorten the total sensing time of the light emitting display panel 110.

Figure 16:
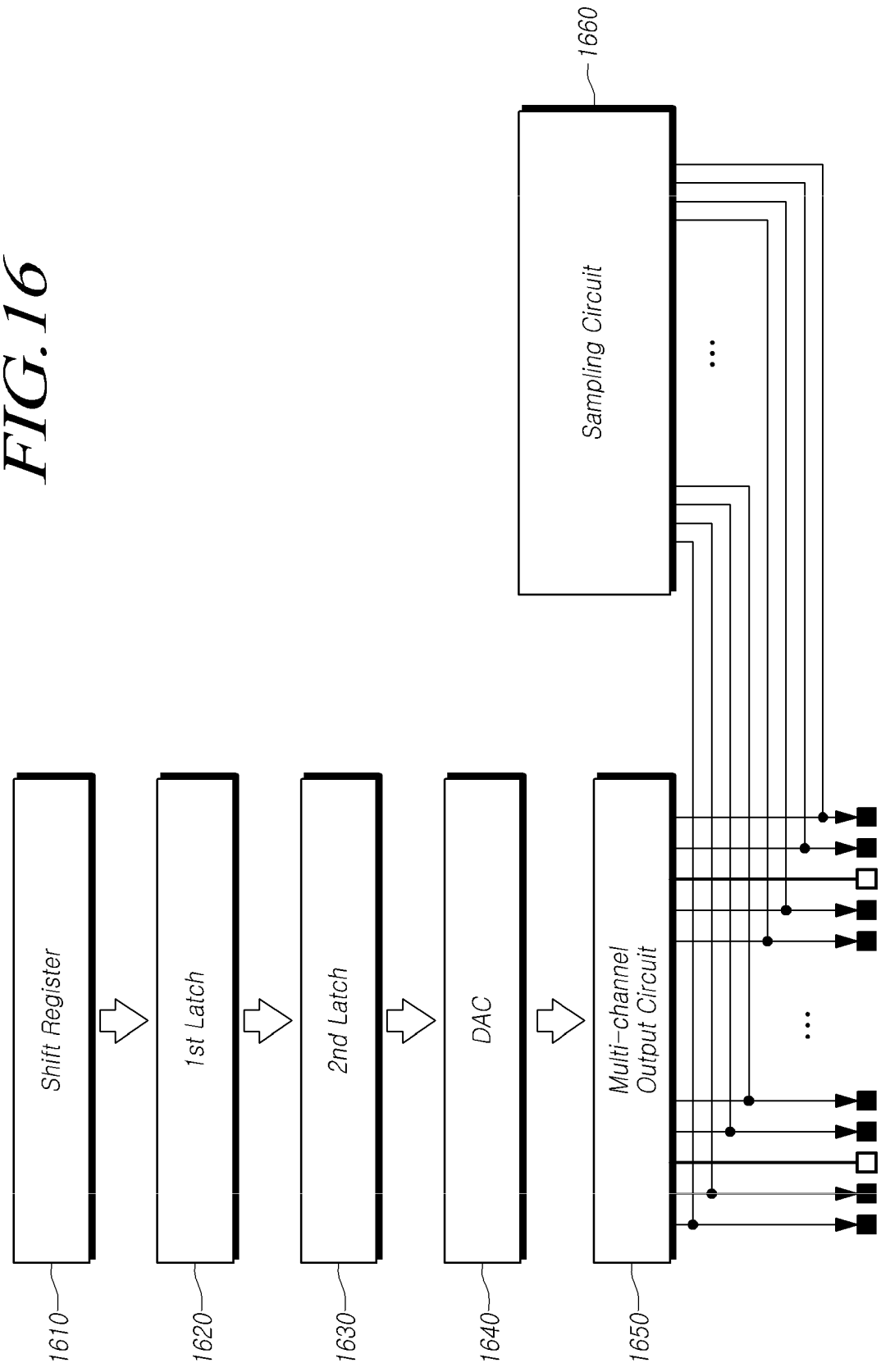
FIG. 16 is a diagram illustrating a source driver integrated circuit of the light emitting display device according to the embodiments of the present disclosure.

FIG. 16 is a diagram illustrating a source driver integrated circuit SDIC of the light emitting display device 100 according to the embodiments of the present disclosure.

Referring to FIG. 16, the source driver integrated circuit SDIC of the light emitting display device 100 according to the embodiments of the present disclosure includes a shift register 1610, a first latch 1620, a second latch 1630, a digital-to-analog converter (DAC) 1640, and a multi-channel output circuit 1650 that includes an output buffer for outputting the data voltage Vdata to a plurality of channels corresponding to the plurality of data lines DL as basic elements for data driving.

In addition, the source driver integrated circuit SDIC of the light emitting display device 100 according to the embodiments of the present disclosure may output the reference voltage Vref to the reference voltage line RVL.

By controlling ON and OFF of the above-mentioned three switch elements PRE_SEL, SPRE, and SAM, the data switch PRE_SEL, the initialization switch SPRE, and the sampling switch SAM can be included as three switch elements allowing the data line DL to operate as one of the data signal line, the sensing driving line, and the sensing line.

Each source driver integrated circuit SDIC which is included in the data driver 120 of the light emitting display device 100 according to the embodiments of the present disclosure includes an analog-to-digital converter ADC that can be connected to a plurality of data lines DL via the sample switches SAM.

Here, the sampling circuit 1660 including the sampling switches SAM connected to the plurality of data lines DL, respectively, may further include a sample and hold circuit between the sampling switch SAM and the analog-to-digital converter ADC.

By using the source driver integrated circuit SDIC, image driving and sensing driving can be provided in a subpixel with the subpixels structure and the signal line structure according to the embodiments of the present disclosure described above.

According to the above-mentioned embodiments of the present disclosure, it is possible to greatly shorten the sensing time for the subpixels.

According to the embodiments of the present disclosure, it is possible to provide the light emitting display panel 110 with the subpixel structure and the signal line structure that can greatly shorten the sensing time for the subpixels, the light emitting display device 100, and the image driving method and the sensing method thereof.

According to the embodiments of the present disclosure, it is possible to provide the light emitting display panel 110 with the subpixel structure and the signal line structure that can greatly shorten the sensing time for the subpixels and increase an aperture ratio, the light emitting display device 100, and the image driving method and the sensing method thereof.

The light emitting display device 100 according to the embodiments of the present disclosure can provide a function of sensing a user's touch. A touch sensing function will be described below.

Figure 17:
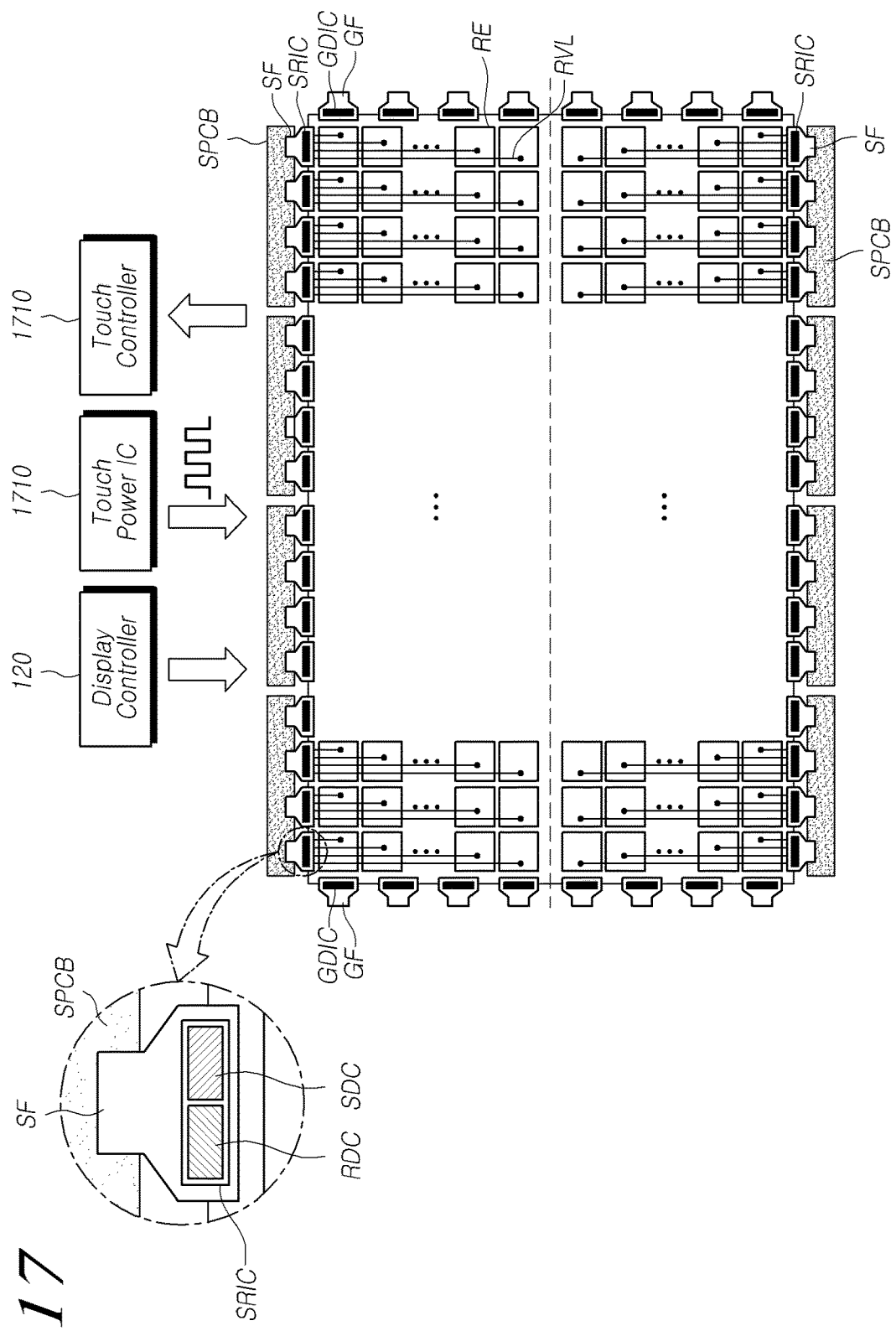
FIG. 17 is a diagram illustrating a touch sensing system of the light emitting display device according to the embodiments of the present disclosure.

FIG. 17 is a diagram illustrating a touch sensing system of the light emitting display device 100 according to the embodiments of the present disclosure.

Referring to FIG. 17, the light emitting display device 100 according to the embodiments of the present disclosure includes a light emitting display panel 110 in which a plurality of reference electrodes RE electrically connected to a plurality of reference voltage lines RVL, respectively, are arranged, data driving circuits SDC that drive a plurality of data lines DL, gate driving circuits GDIC that drive a plurality of gate lines GL, and reference electrode driving circuits RDC that drive one or more of the plurality of reference electrodes RE via one or more of the plurality of reference voltage lines RVL, detect a signal using one or more reference electrodes RE, and outputs touch sensing data.

Referring to FIG. 17, the light emitting display device 100 may further include a touch power integrated circuit 1710 that supplies a signal of which a voltage level is variable to the reference electrode driving circuits RDC and a touch controller 1720 that receives touch sensing data from the reference electrode driving circuits RDC and detects whether there is a touch and/or a touch position.

The data driving circuits SDC constitute the data driver 120.

The data driving circuits SDC and the reference electrode driving circuits RDC may be separately configured. Unlike this, one or more data driving circuits SDC and one or more reference electrode driving circuits RDC may be integrated into one circuit and embodied as an integrated driving circuit SRIC.

The data driving circuits SDC and the reference electrode driving circuits RDC or the integrated driving circuit SRIC may be connected to the light emitting display panel 110, for example, in a chip on film (COF) type. In this case, the data driving circuits SDC and the reference electrode driving circuits RDC or the integrated driving circuit SRIC are mounted on a circuit film SF and one end of the circuit film SF is connected to the light emitting display panel 110. The other end of the circuit film SF is connected to the source printed circuit board S-PCB.

The source printed circuit board S-PCB is electrically connected to the display controller 140, the touch power integrated circuit 1710, and the touch controller 1720, and the like directly or via another printed circuit board.

On the other hand, the gate driver 130 includes gate driving circuits GDIC, and the gate driving circuits GDIC may be connected to the light emitting display panel 110, for example, in a chip on film (COF) type. In this case, the gate driving circuits GDIC is mounted on a circuit film GF and one end of the circuit film GF is connected to the light emitting display panel 110.

On the other hand, a plurality of reference electrodes RE which are embedded and arranged in the light emitting display panel 110 serves to supply a first reference voltage Vref1 for display driving to the subpixels SP.

The plurality of reference electrodes RE which are embedded and arranged in the light emitting display panel 110 serves as touch sensors (touch electrodes) that sense a user's touch thereof with a finger or a pen.

For the purpose of two functions (display driving electrodes and touch sensors) of the plurality of reference electrodes RE which are embedded and arranged in the light emitting display panel 110, the reference electrode driving circuits RDC can output two reference voltages Vref.

The reference electrode driving circuits RDC can output the first reference voltage Vref1 for display driving and output a second reference voltage Vref2 different from the first reference voltage Vref1 for touch driving.

The reference voltage Vref which has been described above with reference to FIGS. 1 to 16 corresponds to the first reference voltage Vref1 for display driving.

For touch driving, the reference electrode driving circuits RDC supply the second reference voltage Vref2 to one or more reference electrodes RE, then detect a signal from the one or more reference electrodes RE, and output sensing data on the basis of the detected signal.

As described above, each subpixel SP includes a light emitting element, a driving transistor DRT that drives the light emitting element, and a first transistor T1 that is controlled between ON and OFF in accordance with a sensing signal SENSE and is electrically connected between the source node or the drain node of the driving transistor DRT and the data line DL. Here, the light emitting element may be an organic light emitting diode OLED, a light emitting diode LED, or a quantum dot light emitting diode.

In the light emitting display panel 110, a second transistor T2 that is controlled between ON and OFF in accordance with a scan signal SCAN and is electrically connected between the reference electrode RE and the gate node of the driving transistor DRT may be further provided.

The second transistor T2 may be provided for each subpixel SP or may be provided for every two or more subpixels SP.

Figure 18:
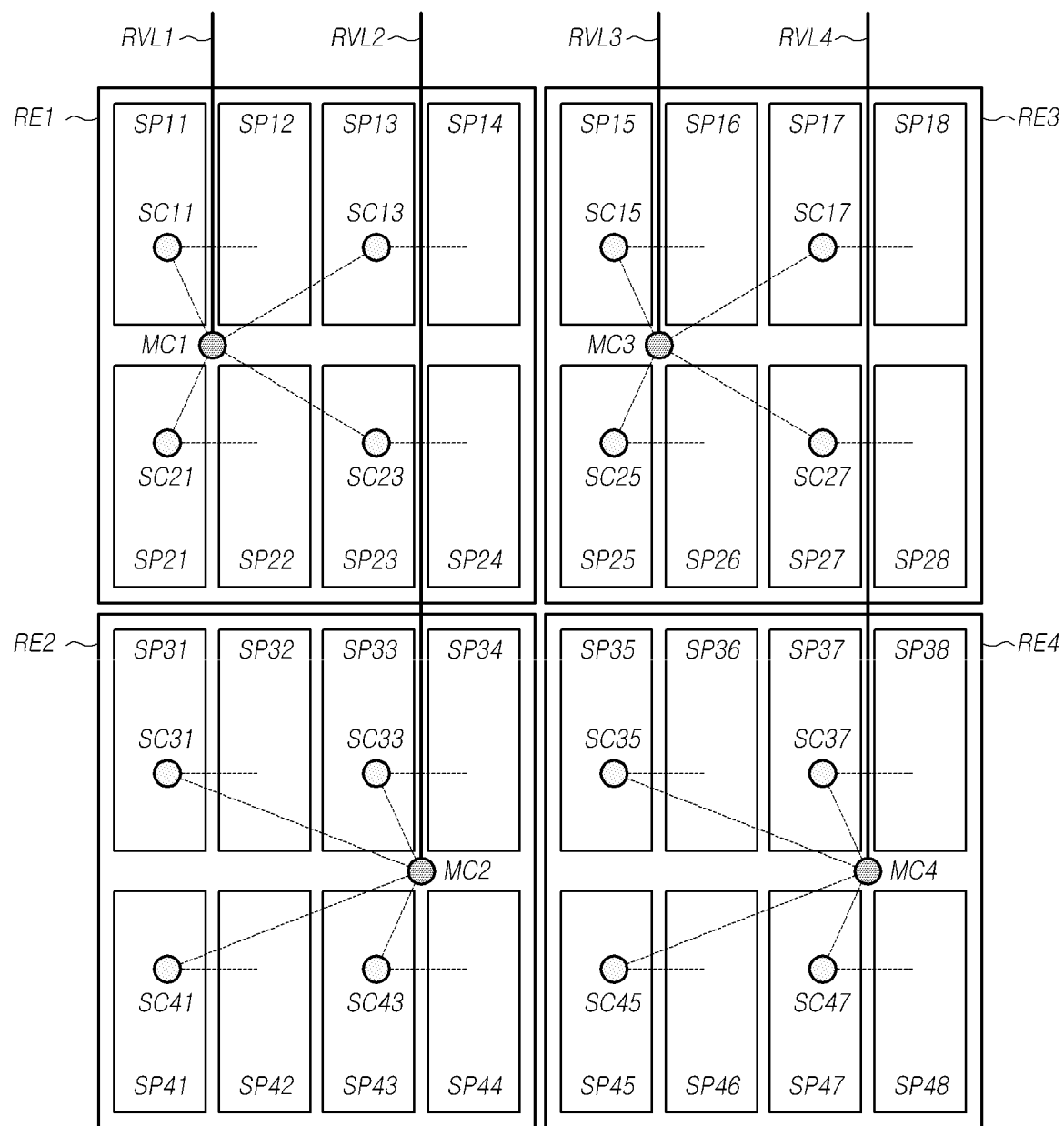
FIGS. 18 and 19 are diagrams illustrating a light emitting display panel with an embedded touch sensor according to the embodiments of the present disclosure.
Figure 19:
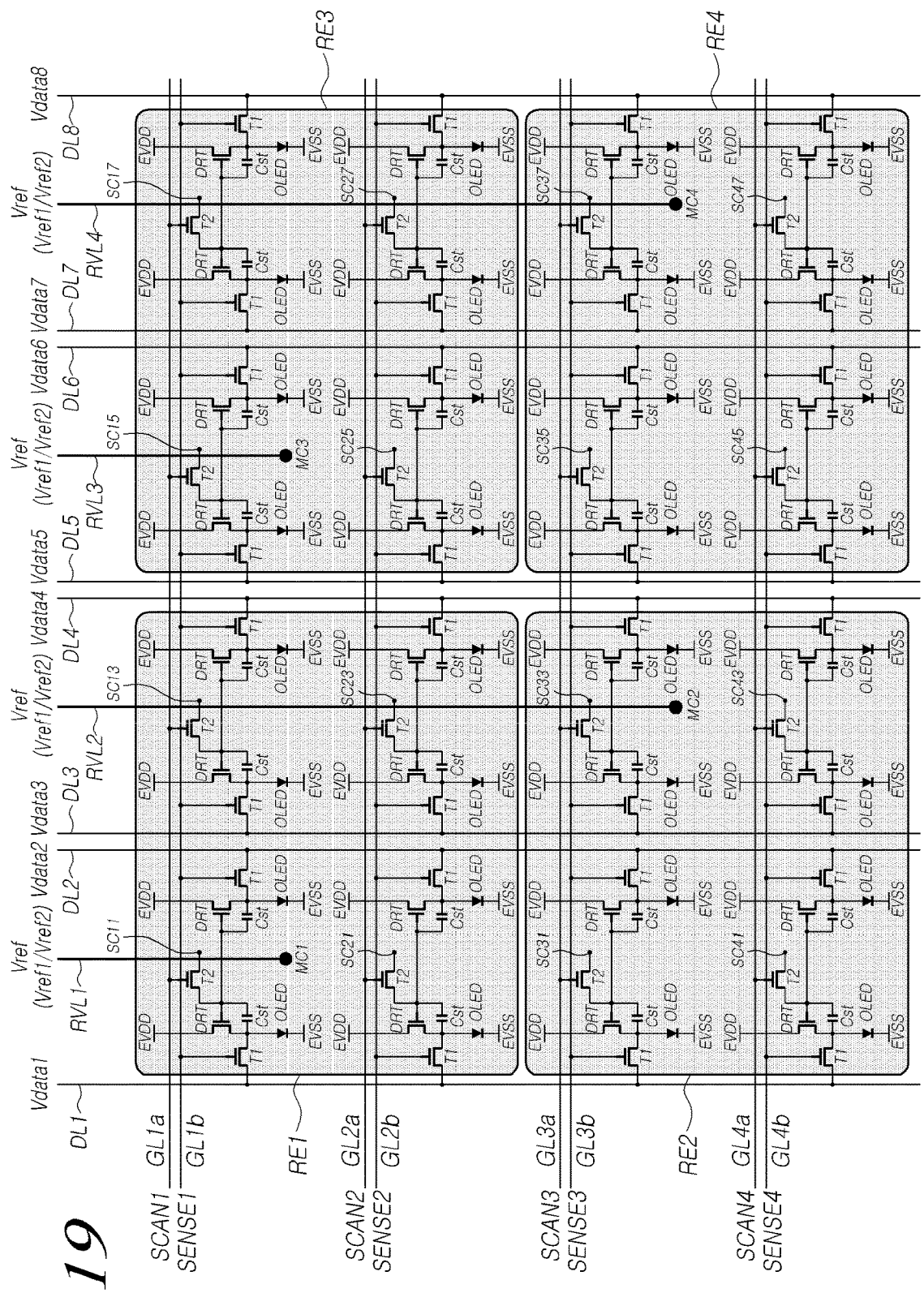

FIGS. 18 and 19 are diagrams illustrating a partial area of a light emitting display panel 110 with an embedded touch sensor according to the embodiments of the present disclosure.

Each of the plurality of reference electrodes RE can overlap two or more subpixels SP.

FIGS. 18 and 19 illustrate areas in which four reference electrodes RE1 to RE4 are arranged, where each of the four reference electrodes RE1 to RE4 overlaps eight subpixels SP arranged in two rows and four columns.

Referring to FIGS. 18 and 19, out of four reference electrodes RE1 to RE4, a first reference electrode RE1 and a second reference electrode RE2 which are arranged in a first column are electrically connected to a first reference voltage line RVL1 and a second reference voltage line RVL2, respectively. A third reference electrode RE3 and a fourth reference electrode RE4 which are arranged in a second column are electrically connected to a third reference voltage line RVL3 and a fourth reference voltage line RVL4, respectively.

Referring to FIGS. 18 and 19, the first reference voltage line RVL1 is connected to the first reference electrode RE1 at a first main contact point MC1. The second reference voltage line RVL2 is connected to the second reference electrode RE2 at a second main contact point MC2. The third reference voltage line RVL3 is connected to the third reference electrode RE3 at a third main contact point MC3. The fourth reference voltage line RVL4 is connected to the fourth reference electrode RE4 at a fourth main contact point MC4.

Referring to FIGS. 18 and 19, the first reference electrode RE1 which is connected to the first reference voltage line RVL1 at the first main contact point MC1 is electrically connected to the drain node (or the source node) of the second transistor T2 in all or some of eight subpixels SP11, SP12, SP13, SP14, SP21, SP22, SP23, and SP24 which are arranged to overlap the area of the first reference electrode RE1 at sub contact points (for example, SC11, SC13, SC21, and SC23).

In the structure illustrated in FIGS. 18 and 19, one second transistor T2 is provided for every two subpixels SP. The reference voltage Vref is supplied to the first reference electrode RE1 in contact with the first reference voltage line RVL1 and is transmitted to four sub contact points (for example, SC11, SC13, SC21, and SC23) in contact with the first reference electrode RE1.

The reference voltage Vref supplied to fourth sub contact points (for example, SC11, SC13, SC21, and SC23) is transmitted to the gate nodes of the driving transistors DRT in four subpixels SP11, SP13, SP21, and SP23 via four turned-on second transistors T2 and is also transmitted to the gate nodes of the driving transistors DRT in the other four subpixels SP12, SP14, SP22, and SP24.

Referring to FIGS. 18 and 19, the second reference electrode RE2 which is connected to the second reference voltage line RVL2 at the second main contact point MC2 is electrically connected to the drain node (or the source node) of the second transistor T2 in all or some of eight subpixels SP31, SP32, SP33, SP34, SP41, SP42, SP43, and SP44 which are arranged to overlap the area of the second reference electrode RE2 at sub contact points (for example, SC31, SC33, SC41, and SC43).

Referring to FIGS. 18 and 19, the third reference electrode RE3 which is connected to the third reference voltage line RVL3 at the third main contact point MC3 is electrically connected to the drain node (or the source node) of the second transistor T2 in all or some of eight subpixels SP15, SP16, SP17, SP18, SP25, SP26, SP27, and SP28 which are arranged to overlap the area of the third reference electrode RE3 at sub contact points (for example, SC15, SC17, SC25, and SC27).

Referring to FIGS. 18 and 19, the fourth reference electrode RE4 which is connected to the fourth reference voltage line RVL4 at the fourth main contact point MC4 is electrically connected to the drain node (or the source node) of the second transistor T2 in all or some of eight subpixels SP35, SP36, SP37, SP38, SP45, SP46, SP47, and SP48 which are arranged to overlap the area of the fourth reference electrode RE4 at sub contact points (for example, SC35, SC37, SC45, and SC47).

Referring to FIGS. 18 and 19, the second reference voltage line RVL2 overlaps the first reference electrode RE1 and is insulated from the first reference electrode RE1 in the light emitting display panel 110. The fourth reference voltage line RVL4 overlaps the third reference electrode RE3 and is insulated from the third reference electrode RE3 in the light emitting display panel 110.

Referring to FIGS. 18 and 19, out of four reference electrodes RE1 to RE4, the first reference electrode RE1 and the second reference electrode RE2 which are arranged in the first column overlap four data lines DL1 to DL4. The third reference electrode RE3 and the fourth reference electrode RE4 which are arranged in the second column overlap four data lines DL5 to DL8.

Referring to FIGS. 18 and 19, out of four reference electrodes RE1 to RE4, the first reference electrode RE1 and the third reference electrode RE3 which are arranged in the first row overlap two gate lines GL1a and GL1b for transmitting a scan signal SCAN1 and a sensing signal SENSE1 to the first subpixel row and two gate lines GL2a and GL2b for transmitting a scan signal SCAN2 and a sensing signal SENSE2 to the second subpixel row. The second reference electrode RE2 and the fourth reference electrode RE4 which are arranged in the second row overlap two gate lines GL3a and GL3b for transmitting a scan signal SCAN3 and a sensing signal SENSE3 to the third subpixel row and two gate lines GL4a and GL4b for transmitting a scan signal SCAN4 and a sensing signal SENSE4 to the fourth subpixel row.

On the other hand, the scan signal and the sensing signal may be supplied via the same gate line. In this case, the first reference electrode RE1 and the third reference electrode RE3 which are arranged in the first row overlap one gate line for transmitting a scan signal SCAN1 and a sensing signal SENSE1 to the first subpixel row and one gate line for transmitting a scan signal SCAN2 and a sensing signal SENSE2 to the second subpixel row. The second reference electrode RE2 and the fourth reference electrode RE4 which are arranged in the second row overlap one gate line for transmitting a scan signal SCAN3 and a sensing signal SENSE3 to the third subpixel row and one gate line for transmitting a scan signal SCAN4 and a sensing signal SENSE4 to the fourth subpixel row.

The arrangement and structure of the second transistor T2 will be described below again.

Each of the plurality of reference electrodes RE overlap subpixels SP in X rows and Y columns, where X and Y are natural numbers equal to or greater than 2. In the example illustrated in FIGS. 18 and 19, X=2 and Y=4 are set.

In the areas of each of the plurality of reference electrodes RE, second transistors T2 equal to or greater than one and less than Y are arranged for every X rows. The drain node or the source node of the second transistor T2 is connected to the corresponding the reference electrode RE. The source node or the drain node of the second transistor T2 is connected to the gate nodes of two or more driving transistors DRT.

Referring to FIGS. 18 and 19, four reference voltage lines RVL1 to RVL4 are arranged in parallel to the data lines DL1 to DL8.

Figure 20:
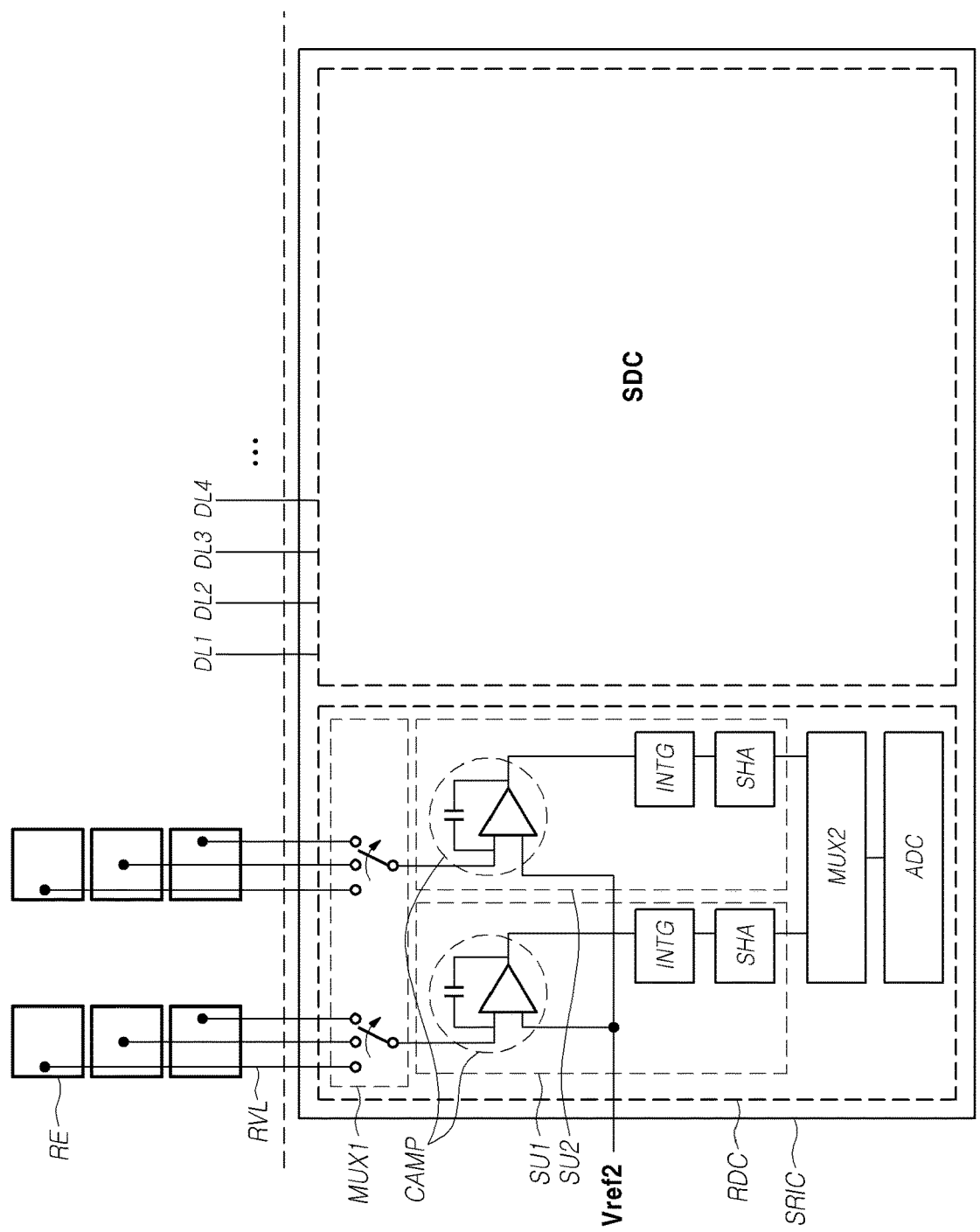
FIG. 20 is a diagram illustrating a driving circuit of the light emitting display device according to the embodiments of the present disclosure.

FIG. 20 is a diagram illustrating a driving circuit SRIC of the light emitting display device 100 according to the embodiments of the present disclosure.

Referring to FIG. 20, a driving circuit SRIC of the light emitting display device 100 according to the embodiments of the present disclosure includes a data driving circuit SDC that supplies a data voltage Vdata to a plurality of data lines DL which are arranged in the light emitting display panel 110 in a first driving period and a reference electrode driving circuit RDC that supplies a first reference voltage Vref1 to a plurality of reference electrodes RE which are arranged in the light emitting display panel 110 in the first driving period and supplies a second reference voltage Vref2 different from the first reference voltage Vref1 to one or more of the plurality of reference electrodes RE in a second driving period different from the first driving period.

The first driving period is a display driving period (which may be an image driving period for displaying an image or may be a sensing period for sensing a threshold voltage or a mobility) and the second driving period may be a touch driving period.

The reference electrode driving circuit RDC includes a first multiplexer circuit MUX1, a plurality of sensing units SU1, SU2, . . . , a second multiplexer circuit MUX2, and an analog-to-digital converter ADC.

The first multiplexer circuit MUX1 can select a reference electrode RE which is to be connected to the plurality of sensing units SU1, SU2, . . . .

Each of the plurality of sensing units SU1, SU2, . . . includes a charge amplifier CAMP, an integrator INTG, and a sample and hold circuit SHA.

The second multiplexer circuit MUX2 selects one of the plurality of sensing units SU1, SU2, . . . and connects the selected sensing unit to the analog-to-digital converter ADC.

The analog-to-digital converter ADC receives an integral value of the integrator INTG and converts the integral value into a sensing value corresponding to a digital value.

The reference electrode driving circuit RDC transmits sensing data including the sensing value to the touch controller 1720.

The reference electrode driving circuit RDC supplies the first reference voltage Vref1 to the plurality of reference electrodes RE in the first driving period.

In the first driving period, the first reference voltage Vref1 which is transmitted (supplied) to the reference electrode RE via the reference voltage line RVL is divided and supplied to the gate nodes of the driving transistors DRT in two or more subpixels SP overlapping the reference electrode RE.

In the second driving period different from the first driving period, the reference electrode driving circuit RDC supplies the second reference voltage Vref2 different from the first reference voltage Vref1 to one or more of the plurality of reference electrodes TE.

In the second driving period, the second reference voltage Vref2 is supplied to the reference electrode RE via the reference voltage line RVL, but is not supplied to the gate node of the driving transistor DRT in two or more subpixels SP overlapping the reference electrode RE.

On the other hand, in the above description, display driving and touch driving are temporally divided and performed at different timings, but display driving and touch driving may be simultaneously performed. That is, a touch may be sensed at the same time as displaying an image.

For simultaneous driving, while display driving and touch driving are being simultaneously performed, the second reference voltage Vref2 is supplied to the reference electrodes RE and all signals such as the data voltage Vdata supplied to the data lines DL, the gate signals SCAN and SENSE supplied to the gate lines GL, the drive voltage EVDD, and the base voltage EVSS can be modulated on the basis of signal characteristics (such as a frequency, a phase, and amplitude) of the second reference voltage Vref2.

For example, for simultaneous driving, the ground voltage supplied to the light emitting display panel 110 may swing to correspond to the second reference voltage Vref2 or reference gamma voltages which are used for a digital-to-analog conversion process of the data driver 120 may swing to correspond to the second reference voltage Vref2.

Figure 21:
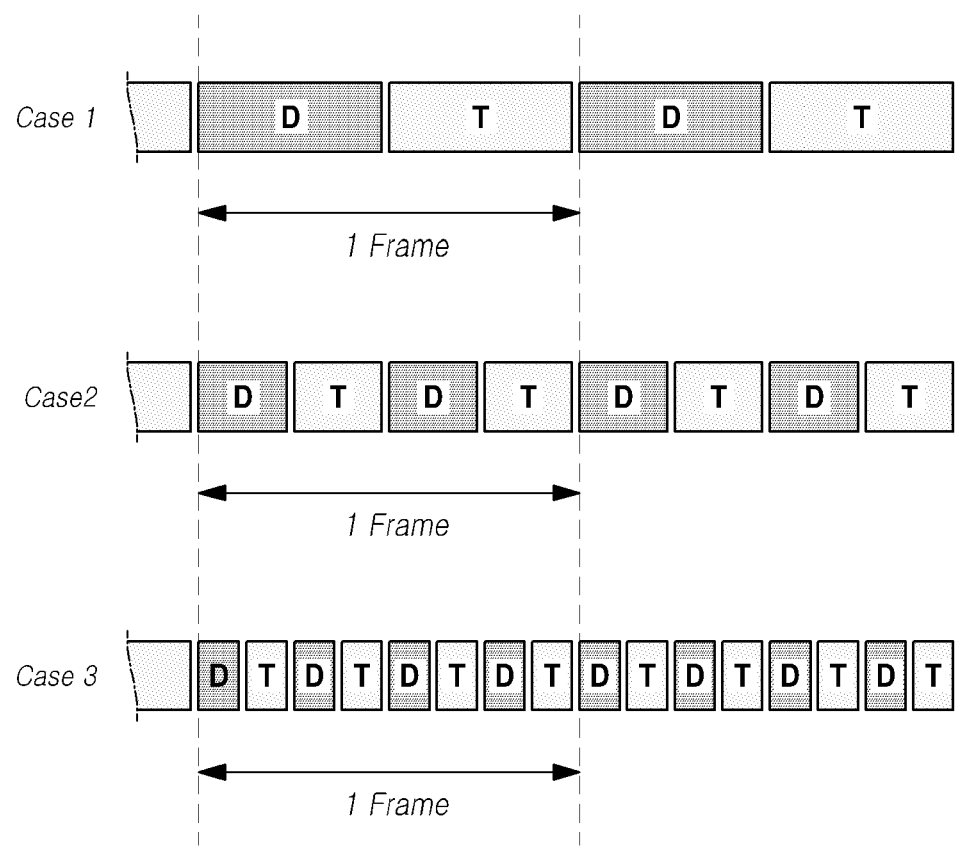
FIG. 21 is a diagram illustrating an example in which a display driving period and a touch driving period are temporally divided when the light emitting display device according to the embodiments of the present disclosure performs display driving and touch driving in a time division manner.

FIG. 21 is a diagram illustrating an example in which a display driving period D and a touch driving period T are temporally divided when the light emitting display device 100 according to the embodiments of the present disclosure performs display driving and touch driving in a time division manner.

Referring to FIG. 21, the light emitting display device 100 can perform display driving for displaying an image and touch driving for sensing a touch at different timings. This driving system is referred to as a time-division driving system.

In the time-division driving system, a display driving period D in which display driving is performed and a touch driving period T in which touch driving is performed may be time sections divided in one frame.

In Case 1, one frame time is divided into two time sections, and one display driving period D and one touch driving period T are allocated to two divided time sections.

In Case 2, one frame time is divided into four time sections, and two display driving periods D and two touch driving periods T are alternately allocated to four divided time sections.

In Case 3, one frame time is divided into five or more time sections, and three or more (or two or more) display driving periods D and two or more (or three or more) touch driving periods T are alternately allocated to five or more divided time sections.

Figure 22:
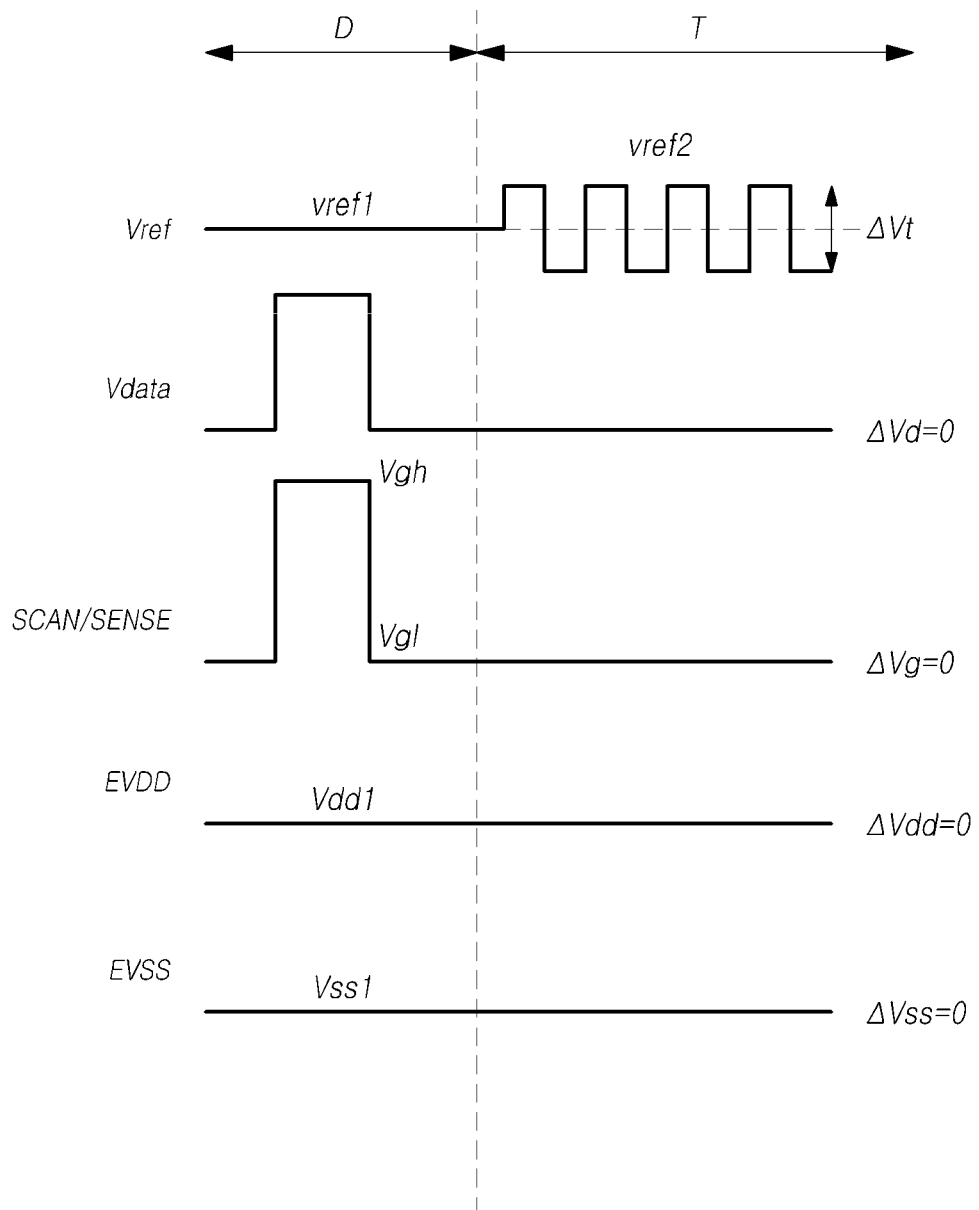
FIG. 22 is a timing diagram illustrating display driving and touch driving in the light emitting display device according to the embodiments of the present disclosure.
Figure 23:
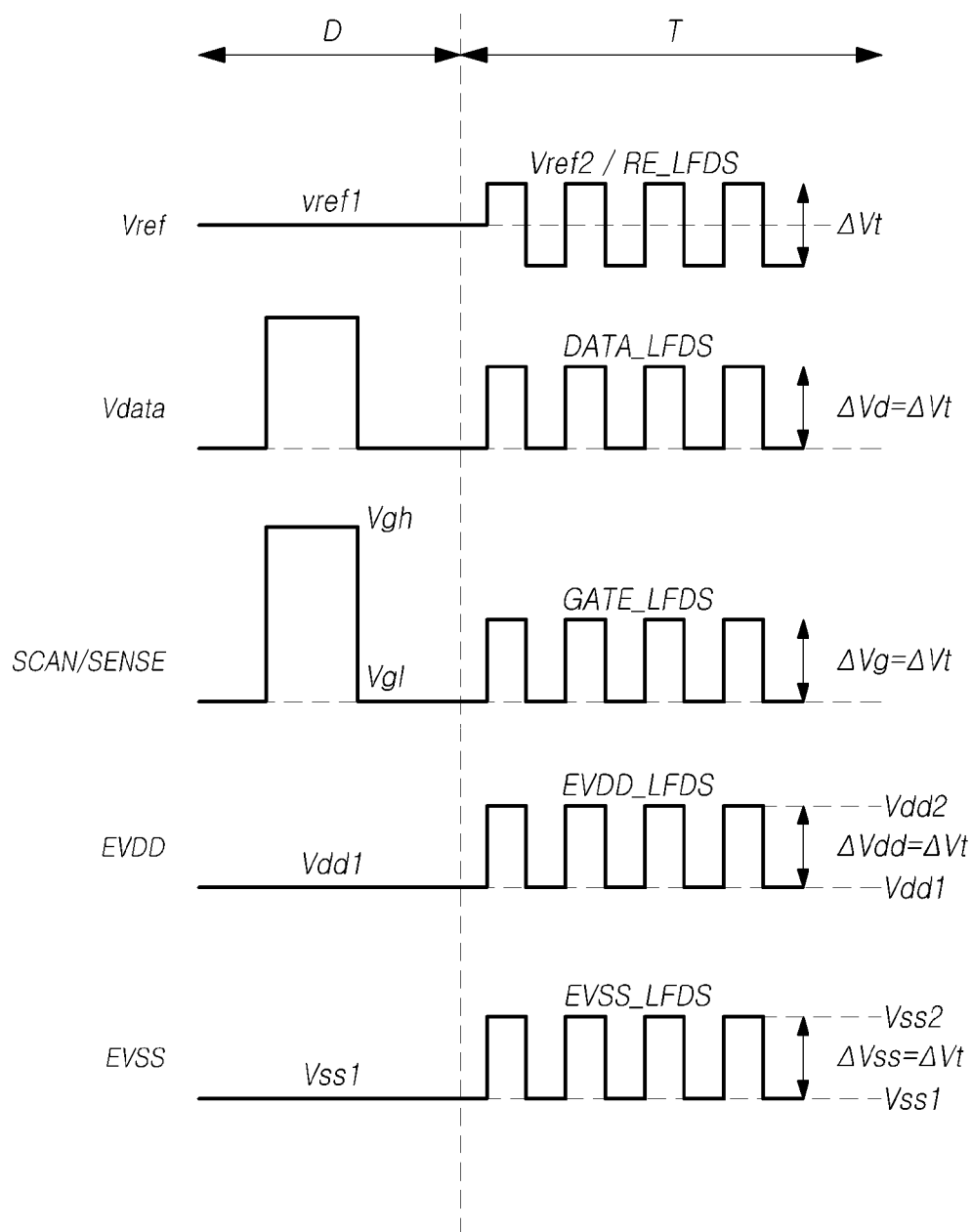
FIG. 23 is a timing diagram illustrating display driving and touch driving when the light emitting display device according to the embodiments of the present disclosure performs load-free driving in a touch driving period.

FIGS. 22 and 23 are timing diagrams illustrating display driving and touch driving in the light emitting display device 100 according to the embodiments of the present disclosure.

In the following description, the first driving period is also referred to as a display driving period (which may be an image driving period for displaying an image or may be a sensing period for sensing a threshold voltage or a mobility) and the second driving period is also referred to as a touch driving period.

Referring to FIGS. 22 and 23, in the display driving period D, the data voltage Vdata for displaying an image is supplied to a plurality of data lines DL. A scan signal SCAN and a sensing signal SENSE are supplied to a plurality of gate lines GL.

The scan signal SCAN and the sensing signal SENSE have a turn-on level voltage at selected timings and have a turn-off level voltage at the other timings.

The turn-on level voltage of the scan signal SCAN is a voltage that can turn on the second transistor T2 and may be a high-level voltage Vgh, for example, when the second transistor T2 is of an N type. The turn-off level voltage of the scan signal SCAN is a voltage that can turn off the second transistor T2 and may be a low-level voltage Vgl, for example, when the second transistor T2 is of an N type.

The turn-on level voltage of the sensing signal SENSE is a voltage that can turn on the first transistor T1 and may be a high-level voltage Vgh, for example, when the first transistor T1 is of an N type. The turn-off level voltage of the sensing signal SENSE is a voltage that can turn off the first transistor T1 and may be a low-level voltage Vg1, for example, when the first transistor T1 is of an N type.

Referring to FIGS. 22 and 23, in the display driving period D, the first reference voltage Vref1 is supplied to the plurality of reference electrodes RE.

The first reference voltage Vref1 may be a DC voltage of a constant voltage level.

Referring to FIGS. 22 and 23, in the display driving period D, the drive voltage EVDD is a DC voltage with a first drive voltage value Vdd1 and the base voltage EVSS may be a DC voltage with a first base voltage value Vss1.

Referring to FIGS. 22 and 23, in the touch driving period T, the second reference voltage Vref2 different from the first reference voltage Vref1 is supplied to one or more reference electrodes RE which is to be sensed out of the plurality of reference electrodes RE.

The second reference voltage Vref2 may be a signal that swings with a selected amplitude $\Delta Vt$. This second reference voltage Vref2 is referred to as an AC signal, a modulation signal or a pulse signal.

The second reference voltage Vref2 has a constant frequency.

Referring to FIG. 22, in the touch driving period T, the data lines DL which are not directly associated with touch driving have a voltage state in which a voltage level is not variable ($\Delta Vd=0$). In the touch driving period T, the gate lines GL which are not directly associated with touch driving have a voltage state in which a voltage level is not variable ($\Delta Vg=0$). In the touch driving period T, the drive voltage lines DVL which are not directly associated with touch driving have a voltage state in which a voltage level is not variable ($\Delta Vdd=0$). In the touch driving period T, the cathode electrodes which are not directly associated with touch driving have a voltage state in which a voltage level is not variable ($\Delta Vss=0$).

According to this configuration, in the touch driving period T, the reference electrode RE which is supplied with the second reference voltage Vref2 can form parasitic capacitance with the data line DL, the gate line GL, the drive voltage line DVL, and the cathode electrode. The parasitic capacitance causes distortion of a touch sensing value, an RC delay increase, and the like and decreases touch sensitivity.

In order to prevent such parasitic capacitance, the light emitting display device 100 can perform load-free driving.

Referring to FIG. 23, in load-free driving, all or some of the plurality of data lines DL are supplied with a first load-free signal DATA_LFDS in which one or more of a frequency, a phase, and an amplitude corresponds to the second reference voltage Vref2 in the touch driving period T.

The first load-free signal DATA_LFDS has an amplitude $\Delta Vd=\Delta Vt$ corresponding to the second reference voltage Vref2.

In load-free driving, all or some of the plurality of gate lines GL are supplied with a second load-free signal GATE_LFDS in which one or more of a frequency, a phase, and an amplitude corresponds to the second reference voltage Vref2 in the touch driving period T.

The second load-free signal GATE_LFDS has an amplitude $\Delta Vg=\Delta Vt$ corresponding to the second reference voltage Vref2.

In load-free driving, all or some of the plurality of drive voltage lines DVL are supplied with a third load-free signal EVDD_LFDS in which one or more of a frequency, a phase, and an amplitude corresponds to the second reference voltage Vref2 in the touch driving period T.

The third load-free signal EVDD_LFDS swings between a first drive voltage value Vdd1 and a second drive voltage value Vdd2 and has an amplitude $\Delta Vdd=\Delta Vt$ corresponding to the second reference voltage Vref2.

In load-free driving, the cathode electrodes are supplied with a fourth load-free signal EVSS_LFDS in which one or more of a frequency, a phase, and an amplitude corresponds to the second reference voltage Vref2 in the touch driving period T.

The fourth load-free signal EVSS_LFDS swings between a first base voltage value Vss1 and a second base voltage value Vss2 and has an amplitude $\Delta Vss=\Delta Vt$ corresponding to the second reference voltage Vref2.

On the other hand, according to load-free driving, when the reference electrodes RE which are to be sensed are supplied with the second reference voltage Vref2, the other reference electrodes RE which are not to be sensed are supplied with a fifth load-free signal RE_LFDS in which one or more of a frequency, a phase, and an amplitude corresponds to the second reference voltage Vref2 in the touch driving period T.

The fifth load-free signal RE_LFDS has an amplitude $\Delta Vt$ corresponding to the second reference voltage Vref2.

The operations of turning on and off the first transistor T1 and the second transistor T2 will be described below again in association with load-free driving.

The first transistor T1 is turned on at a selected timing in the display driving period D and supplies the data voltage Vdata which is supplied via the data line DL to the source node or the drain node of the driving transistor DRT.

The first transistor T1 is turned off in the touch driving period T.

Accordingly, in the display driving period D, the sensing signal SENSE has a turn-on level voltage (for example, Vgh) at a timing at which the first transistor T1 is turned on and has a turn-off level voltage (for example, Vgl) at other timings. In the touch driving period T, the voltage level of the sensing signal SENSE swings within a turn-off level voltage range and one or more of a frequency, a phase, and an amplitude thereof corresponds to the second reference voltage Vref2.

The second transistor T2 is turned on at a selected timing in the display driving period D and supplies the first reference voltage Vref1 which is supplied to the reference electrode RE via the reference voltage line RVL to the gate node of the driving transistor DRT.

The second transistor T2 is turned off in the touch driving period T.

Accordingly, in the display driving period D, the scan signal SCAN has a turn-on level voltage (for example, Vgh) at a timing at which the second transistor T2 is turned on and has a turn-off level voltage (for example, Vgl) at other timings. In the touch driving period T, the voltage level of the scan signal SCAN swings within a turn-off level voltage range and one or more of a frequency, a phase, and an amplitude thereof corresponds to the second reference voltage Vref2.

FIG. 24 is a diagram illustrating a swing circuit of a drive voltage EVDD and a base voltage EVSS when the light emitting display device 100 according to the embodiments of the present disclosure performs load-free driving in a touch driving period.

Referring to FIG. 24, a swing circuit of the drive voltage EVDD includes a touch power IC 1710 and two transistors TRA and TRC.

The touch power IC 1710 controls ON and OFF of two transistors TRA and TRC using two control signals A and C. The touch power IC 1710 outputs the second drive voltage value Vdd2.

Under the control of the touch power IC 1710, two transistors TRA and TRC are alternately turned on and off. Accordingly, the first drive voltage value Vdd1 and the second drive voltage value Vdd2 are alternately supplied to the drive voltage line DVL.

The difference ΔVdd between the first drive voltage value Vdd1 and the second drive voltage value Vdd2 corresponds to the amplitude ΔVt of the second reference voltage Vref2.

Referring to FIG. 24, a swing circuit of the base voltage EVSS includes a touch power IC 1710 and two transistors TRB and TRD.

The touch power IC 1710 controls ON and OFF of two transistors TRB and TRD using two control signals B and D. The touch power IC 1710 outputs the second base voltage value Vss2.

Under the control of the touch power IC 1710, two transistors TRB and TRD are alternately turned on and off. Accordingly, the first base voltage value Vss1 and the second base voltage value Vss2 are alternately supplied to the cathode electrode.

The difference ΔVss between the first base voltage value Vss1 and the second base voltage value Vss2 corresponds to the amplitude ΔVt of the second reference voltage Vref2.

Figure 25:
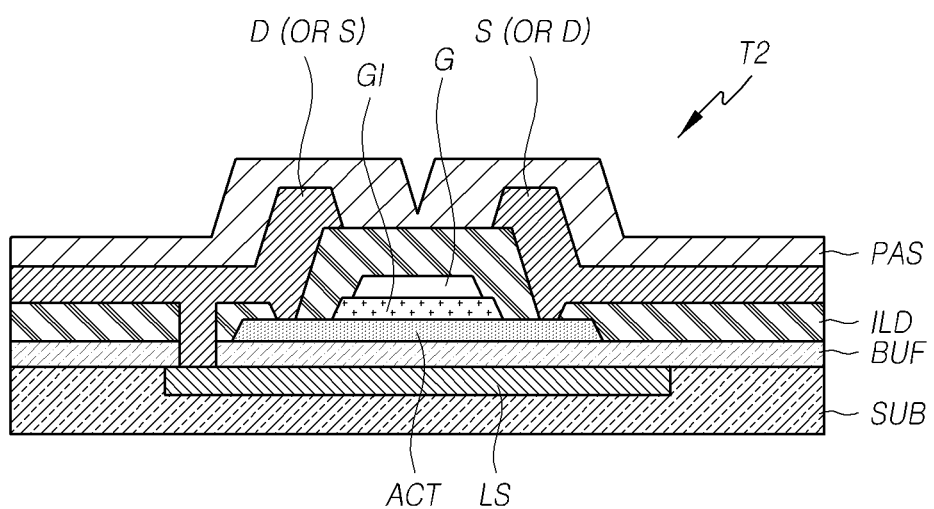
FIGS. 25 and 26 are diagrams illustrating an example of a configuration of a reference electrode in the light emitting display panel according to the embodiments of the present disclosure.
Figure 26:
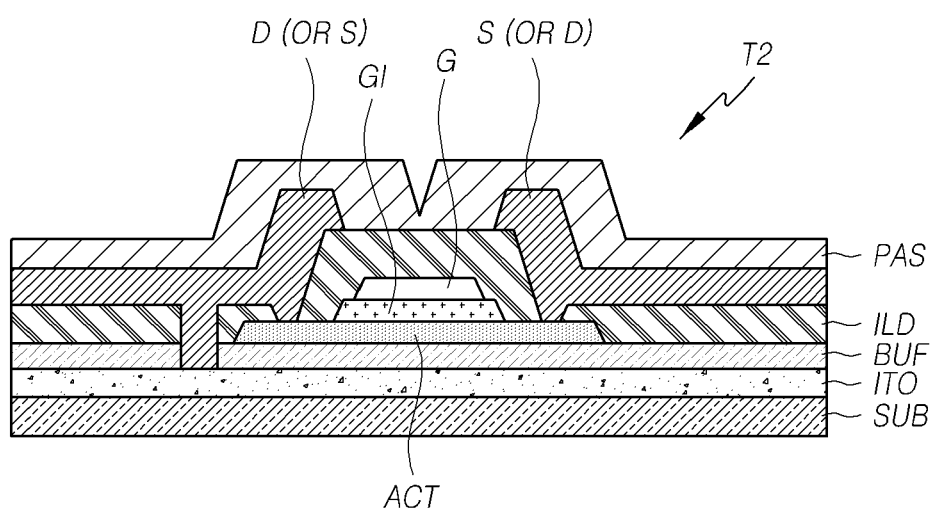

FIGS. 25 and 26 are diagrams illustrating an example of a configuration of a reference electrode RE in the light emitting display panel 110 according to the embodiments of the present disclosure.

Referring to FIGS. 25 and 26, in the light emitting display panel 110, a buffer layer BUF is disposed on a substrate SUB.

An active layer ACT is disposed on the buffer layer BUF, a gate insulating film GI is disposed on the active layer ACT, and a gate electrode G is disposed on the gate insulating film GI.

An interlayer insulating film ILD is disposed to cover all the gate electrode G, the active layer ACT, the gate insulating film GI, and the buffer layer BUF.

Source and drain electrodes S and D are disposed on the interlayer insulating film ILD. The source and drain electrodes S and D are in contact with one end and the other end of the active layer ACT via a hole formed in the interlayer insulating film ILD. A passivation layer PAS is disposed thereon.

Referring to FIG. 25, a light shield layer LS is disposed under the active layer ACT in a transistor area (an area in which S, D, G, and ACT are formed).

Each of the plurality of reference electrodes RE corresponds to the light shield layer LS which is disposed under the active layer ACT in the transistor area (an area in which S, D, G, and ACT are formed).

When the transistor illustrated in FIG. 25 is the second transistor T2, the drain electrode D or the source electrode S of the second transistor T2 are in contact with the reference electrode RE corresponding to the light shield layer LS.

Referring to FIG. 26, an indium tin oxide (ITO) layer for improvement in performance of a touch sensor (an increase in touch capacitance) is disposed under the active layer ACT in the transistor area (an area in which S, D, G, and ACT are formed), and the ITO layer can be used as the reference electrode RE.

When the transistor illustrated in FIG. 25 is the second transistor T2, the drain electrode D or the source electrode S of the second transistor T2 is in contact with the reference electrode RE corresponding to the ITO layer.

On the other hand, the reference electrode RE is located under the encapsulation layer.

Figure 27:
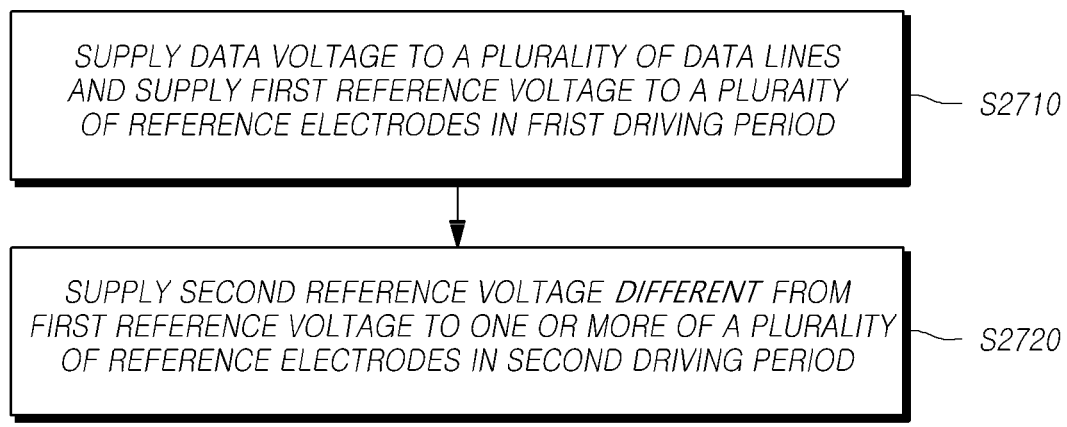
FIG. 27 is a flowchart illustrating a method of driving the light emitting display device according to the embodiments of the present disclosure.

FIG. 27 is a flowchart illustrating a method of driving the light emitting display device 100 according to the embodiments of the present disclosure.

Referring to FIG. 27, a method of driving the light emitting display device 100 according to the embodiments of the present disclosure includes a step S2710 of supplying a data voltage Vdata to a plurality of data lines DL and supplying a first reference voltage Vref1 to a plurality of reference electrodes RE which are electrically connected to a plurality of reference voltage lines RVL in a first driving period and a step S2720 of supplying a second reference voltage Vref2 different from the first reference voltage Vref1 to one or more of the plurality of reference electrodes RE via one or more of the plurality of reference voltage lines RVL in a second driving period different from the first driving period.

The first driving period may be an image driving period for displaying an image or a display sensing period for sensing a threshold voltage or a mobility, and the second driving period may be a touch driving period.

The first reference voltage Vref1 has a constant voltage level, and the second reference voltage Vref2 swings with a selected amplitude.

According to the embodiments of the present disclosure, it is possible to provide a light emitting display device, a light emitting display panel, a driving circuit, and a driving method in which a touch sensor is embedded.

According to the embodiments of the present disclosure, it is possible to provide a light emitting display device, a light emitting display panel, a driving circuit, and a driving method in which a touch sensor is embedded in conjunction with a subpixel structure.

According to the embodiments of the present disclosure, it is possible to provide a light emitting display device, a light emitting display panel, a driving circuit, and a driving method that can provide an improved touch sensitivity.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. Additional changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light emitting display device, comprising:
a light emitting display panel including:
   a plurality of data lines and a plurality of reference voltage lines arranged in a first direction;
   a plurality of gate lines arranged in a second direction;
   a plurality of subpixels which are formed adjacent to the overlap locations of respective data lines and gate lines; and
   a plurality of reference electrodes which are electrically connected to the plurality of reference voltage lines;
a data driving circuit that drives the plurality of data lines; and
a reference electrode driving circuit that drives the plurality of reference electrodes via the plurality of reference voltage lines,
wherein each subpixel of the plurality of subpixels includes:
   a light emitting element,
   a driving transistor that drives the light emitting element,
   a first transistor that is controlled between ON and OFF in accordance with a sensing signal and is electrically connected between a source node or a drain node of the driving transistor and the corresponding data line, and
   a second transistor that is controlled between ON and OFF in accordance with a scan signal and is electrically connected between the reference electrode and a gate node of the driving transistor and is disposed in the light emitting display panel,
wherein, in a first driving period, the data driving circuit supplies a data voltage to the plurality of data lines and the reference electrode driving circuit supplies a first reference voltage to the plurality of reference electrodes via the plurality of reference voltage lines,
wherein, in a second driving period different from the first driving period, the reference electrode driving circuit supplies a second reference voltage different from the first reference voltage to at least one of the plurality of reference electrodes via at least one of the plurality of reference voltage lines,
wherein the second transistor is turned on at a selected timing in the first driving period and supplies the first reference voltage supplied to the reference electrode via the reference voltage line to the gate node of the driving transistor,
wherein the second transistor is turned off in the second driving period,
wherein each of the plurality of reference electrodes overlap the subpixels of X rows and Y columns where X and Y are natural numbers equal to or greater than 2,
wherein the second transistors of equal to or greater than one and equal to or less than Y are arranged every X rows in areas of each of the plurality of reference electrodes,
wherein a drain node or a source node of the second transistor is connected to the corresponding reference electrode, and
wherein the source node or the drain node of the second transistor is connected to the gate nodes of two or more driving transistors.

2. The light emitting display device according to claim 1, wherein each of the plurality of reference electrodes overlaps two or more subpixels,
   wherein the plurality of reference electrodes include a first reference electrode and a second reference electrode,
   wherein the first reference electrode is electrically connected to a first reference voltage line,
   wherein the second reference electrode is electrically connected to a second reference voltage line, and
   wherein the second reference voltage line overlaps the first reference electrode and is insulated from the first reference electrode in the light emitting display panel.

3. The light emitting display device according to claim 1, wherein, in the first driving period, the first reference voltage which is supplied to the reference electrode via the reference voltage line is divided and is supplied to gate nodes of the driving transistors in two or more subpixels overlapping the reference electrode, and
   wherein, in the second driving period, the second reference voltage which is supplied to the reference electrode via the reference voltage line is not supplied to the gate nodes of the driving transistors in two or more subpixels overlapping the reference electrode.

4. The light emitting display device according to claim 1, wherein the first transistor is turned on at a selected timing in the first driving period and supplies the data voltage supplied via the data line to a source node or a drain node of the driving transistor, and
   wherein the first transistor is turned off in the second driving period.

5. The light emitting display device according to claim 4, wherein the sensing signal has a turn-on level voltage at a turn-on timing of the first transistor and has a turn-off level voltage at other timings in the first driving period, and
   wherein a voltage level of the sensing signal swings within a turn-off level voltage range and one or more of a frequency, a phase, and an amplitude of the sensing signal correspond to the second reference voltage in the second driving period.

6. The light emitting display device according to claim 1, wherein the scan signal has a turn-on level voltage at a turn-on timing of the second transistor and has a turn-off level voltage at other timings in the first driving period, and
   wherein a voltage level of the scan signal swings within a turn-off level voltage range and one or more of a frequency, a phase, and an amplitude of the scan signal correspond to the second reference voltage in the second driving period.

7. The light emitting display device according to claim 1, wherein the second transistor is disposed for each subpixel.

8. The light emitting display device according to claim 1, wherein the first driving period is at least one of an image driving period for displaying an image or a display sensing period for sensing a threshold voltage or a mobility,
   wherein the second driving period is a touch driving period,
   wherein the first reference voltage has a constant voltage level, and
   wherein the second reference voltage swings with a selected amplitude.

9. The light emitting display device according to claim 8, wherein a data load-free signal of which one or more of a frequency, a phase, and an amplitude corresponds to the second reference voltage is supplied to all or some of the plurality of data lines in the second driving period.

10. The light emitting display device according to claim 8, wherein a gate load-free signal of which one or more of a frequency, a phase, and an amplitude corresponds to the second reference voltage is supplied to all or some of the plurality of gate lines in the second driving period.

11. A method of driving a light emitting display device in which a plurality of data lines and a plurality of reference voltage lines are arranged in a first direction, a plurality of gate lines are arranged in a second direction, a plurality of subpixels which are formed adjacent to overlap locations of respective data lines and gate lines, the method comprising:
supplying a data voltage to the plurality of data lines and supplying a first reference voltage to a plurality of reference electrodes which are electrically connected to the plurality of reference voltage lines in a first driving period; and
supplying a second reference voltage different from the first reference voltage to one or more of the plurality of reference electrodes via one or more of the plurality of reference voltage lines in a second driving period different from the first driving period,
wherein each subpixel of the plurality of subpixels includes:
a light emitting element,
a driving transistor that drives the light emitting element,
a first transistor that is controlled between ON and OFF in accordance with a sensing signal and is electrically connected between a source node or a drain node of the driving transistor and the corresponding data line, and
a second transistor that is controlled between ON and OFF in accordance with a scan signal and is electrically connected between the reference electrode and a gate node of the driving transistor and is disposed in the light emitting display device,
wherein the second transistor is turned on at a selected timing in the first driving period and supplies the first reference voltage supplied to the reference electrode via the reference voltage line to the gate node of the driving transistor,
wherein the second transistor is turned off in the second driving period,
wherein each of the plurality of reference electrodes overlap the subpixels of X rows and Y columns where X and Y are natural numbers equal to or greater than 2,
wherein the second transistors of equal to or greater than one and equal to or less than Y are arranged every X rows in areas of each of the plurality of reference electrodes,
wherein a drain node or a source node of the second transistor is connected to the corresponding reference electrode, and
wherein the source node or the drain node of the second transistor is connected to the gate nodes of two or more driving transistors.

12. The method of driving a light emitting display device according to claim 11, wherein the first driving period is at least one of an image driving period for displaying an image or a display sensing period for sensing a threshold voltage or a mobility,
wherein the second driving period is a touch driving period,
wherein the first reference voltage has a constant voltage level, and
wherein the second reference voltage swings with a selected amplitude.

13. A light emitting display panel, comprising:
a plurality of data lines that are arranged in a first direction;
a plurality of reference voltage lines that are arranged in the first direction;
a plurality of gate lines that are arranged in a second direction;
a plurality of subpixels that are formed adjacent to overlap locations of respective data lines and gate lines; and
a plurality of reference electrodes that are electrically connected to the plurality of reference voltage lines,
wherein each subpixel includes a light emitting element, a driving transistor that drives the light emitting element, a first transistor that is controlled between ON and OFF in accordance with a sensing signal and is electrically connected between a source node or a drain node of the driving transistor and the corresponding data line, and a second transistor that is controlled between ON and OFF in accordance with a scan signal and is electrically connected between the reference electrode and a gate node of the driving transistor and is disposed in the light emitting display panel,
wherein the plurality of reference electrodes are supplied with a first reference voltage via the plurality of reference voltage lines in a first driving period, and
wherein one or more of the plurality of reference electrodes are supplied with a second reference voltage different from the first reference voltage via one or more of the plurality of reference voltage lines in a second driving period different from the first driving period,
wherein the second transistor is turned on at a selected timing in the first driving period and supplies the first reference voltage supplied to the reference electrode via the reference voltage line to the gate node of the driving transistor,
wherein the second transistor is turned off in the second driving period,
wherein each of the plurality of reference electrodes overlap the subpixels of X rows and Y columns where X and Y are natural numbers equal to or greater than 2,
wherein the second transistors of equal to or greater than one and equal to or less than Y are arranged every X rows in areas of each of the plurality of reference electrodes,
wherein a drain node or a source node of the second transistor is connected to the corresponding reference electrode, and
wherein the source node or the drain node of the second transistor is connected to the gate nodes of two or more driving transistors.

14. The light emitting display panel according to claim 13, wherein each of the plurality of reference electrodes is disposed under an active layer in a transistor area.

15. A driving circuit that drives a light emitting display panel including a light emitting element, a driving transistor that drives the light emitting element, a first transistor that is controlled between ON and OFF in accordance with a sensing signal and is electrically connected between a source node or a drain node of the driving transistor and a corresponding data line, and a second transistor that is controlled between ON and OFF in accordance with a scan signal and is electrically connected between the reference electrode and a gate node of the driving transistor and is disposed in the light emitting display panel, the driving circuit comprising:

a data driving circuit that supplies a data voltage to a plurality of data lines which are arranged in the light emitting display panel in a first driving period; and a reference electrode driving circuit configured to:
supply a first reference voltage to a plurality of reference electrodes which are arranged in the light emitting display panel in the first driving period; and supply a second reference voltage different from the first reference voltage to one or more of the plurality of reference electrodes in a second driving period different from the first driving period, wherein the second transistor is turned on at a selected timing in the first driving period and supplies the first reference voltage supplied to the reference electrode via the reference voltage line to the gate node of the driving transistor, wherein the second transistor is turned off in the second driving period, wherein each of the plurality of reference electrodes overlap the subpixels of X rows and Y columns where X and Y are natural numbers equal to or greater than 2, wherein the second transistors of equal to or greater than one and equal to or less than Y are arranged every X rows in areas of each of the plurality of reference electrodes, wherein a drain node or a source node of the second transistor is connected to the corresponding reference electrode, and wherein the source node or the drain node of the second transistor is connected to the gate nodes of two or more driving transistors.

\* \* \* \* \*